(12) United States Patent
Morton et al.

(10) Patent No.: US 12,502,253 B2
(45) Date of Patent: Dec. 23, 2025

(54) DENTAL APPLIANCE HAVING SELECTIVE OCCLUSAL LOADING AND CONTROLLED INTERCUSPATION

(71) Applicant: Align Technology, Inc., San Jose, CA (US)

(72) Inventors: John Y. Morton, San Jose, CA (US); Bruce Cam, San Jose, CA (US)

(73) Assignee: Align Technology, Inc., San Jose, CA (US)

(*) Notice: Subject to any disclaimer, the term of this patent is extended or adjusted under 35 U.S.C. 154(b) by 303 days.

(21) Appl. No.: 18/160,964

(22) Filed: Jan. 27, 2023

(65) Prior Publication Data

US 2023/0165662 A1 Jun. 1, 2023

Related U.S. Application Data

(63) Continuation of application No. 16/177,067, filed on Oct. 31, 2018, now Pat. No. 11,576,752.

(60) Provisional application No. 62/579,519, filed on Oct. 31, 2017.

(51) Int. Cl.
*A61C 7/00* (2006.01)
*A61C 7/08* (2006.01)
*A61C 7/36* (2006.01)
*A61C 9/00* (2006.01)

(52) U.S. Cl.
CPC .............. *A61C 7/08* (2013.01); *A61C 7/002* (2013.01); *A61C 7/36* (2013.01); *A61C 9/0006* (2013.01)

(58) Field of Classification Search
None
See application file for complete search history.

(56) References Cited

U.S. PATENT DOCUMENTS

| | | | | |
|---|---|---|---|---|
| 1,597,529 | A * | 8/1926 | Leonard | A61C 7/00 433/19 |
| 4,330,273 | A * | 5/1982 | Kesling | A61C 7/00 433/5 |
| 5,328,362 | A * | 7/1994 | Watson | A61C 7/08 523/120 |
| 5,820,368 | A | 10/1998 | Wolk | |
| 6,386,864 | B1 | 5/2002 | Kuo | |
| 6,783,604 | B2 | 8/2004 | Tricca | |
| 6,790,035 | B2 | 9/2004 | Tricca et al. | |
| 6,932,598 | B1 * | 8/2005 | Anderson | A61C 7/36 433/18 |
| 6,947,038 | B1 | 9/2005 | Anh et al. | |
| 7,104,792 | B2 | 9/2006 | Taub et al. | |

(Continued)

*Primary Examiner* — Heidi M Eide
(74) *Attorney, Agent, or Firm* — Shay Glenn LLP

(57) ABSTRACT

Dental aligners and systems for producing controlled tooth-moving forces. A dental aligner may include a first tooth receiving cavity with a wall configured to resiliently apply a first force to a first tooth in accordance with a treatment plan. The first tooth receiving cavity may include an occlusal inner surface forming a first configuration of cusps and nadirs shaped to conform to an occlusal surface of the first tooth, and an occlusal outer surface forming a second configuration of cusps and nadirs. One or more occlusal contact features protruding from the outer occlusal surface may redirect a bite force on the first tooth that is produced by a person wearing the dental aligner toward a same or a complementary direction as the first force in accordance with the treatment.

20 Claims, 10 Drawing Sheets

(56) References Cited

U.S. PATENT DOCUMENTS

| | | |
|---|---|---|
| 7,160,107 B2 | 1/2007 | Kopelman et al. |
| 7,448,514 B2 | 11/2008 | Wen |
| 7,600,999 B2 | 10/2009 | Knopp |
| 7,766,658 B2 | 8/2010 | Tricca et al. |
| 7,771,195 B2 | 8/2010 | Knopp et al. |
| 7,871,269 B2 | 1/2011 | Wu et al. |
| 7,883,334 B2 | 2/2011 | Li et al. |
| 7,914,283 B2 | 3/2011 | Kuo |
| 8,235,715 B2 | 8/2012 | Kuo |
| 8,337,199 B2 | 12/2012 | Wen |
| 8,401,686 B2 | 3/2013 | Moss et al. |
| 8,562,337 B2 | 10/2013 | Kuo et al. |
| 8,684,729 B2 | 4/2014 | Wen |
| 8,758,009 B2 | 6/2014 | Chen et al. |
| 9,119,691 B2 | 9/2015 | Namiranian et al. |
| 9,326,831 B2 | 5/2016 | Cheang |
| 9,339,410 B2 * | 5/2016 | Smith ............ A61F 5/56 |
| 9,655,691 B2 | 5/2017 | Li et al. |
| 9,700,385 B2 | 7/2017 | Webber |
| 9,844,424 B2 | 12/2017 | Wu et al. |
| 9,861,451 B1 * | 1/2018 | Davis ............ A61C 7/08 |
| 10,045,835 B2 | 8/2018 | Boronkay et al. |
| 10,111,730 B2 | 10/2018 | Webber et al. |
| 10,150,244 B2 | 12/2018 | Sato et al. |
| 10,201,409 B2 | 2/2019 | Mason et al. |
| 10,213,277 B2 | 2/2019 | Webber et al. |
| 10,363,116 B2 | 7/2019 | Boronkay |
| D865,180 S | 10/2019 | Bauer et al. |
| 10,463,452 B2 | 11/2019 | Matov et al. |
| 10,492,888 B2 | 12/2019 | Chen et al. |
| 10,517,701 B2 | 12/2019 | Boronkay |
| 10,537,463 B2 | 1/2020 | Kopelman |
| 10,555,792 B2 | 2/2020 | Kopelman et al. |
| 10,588,776 B2 | 3/2020 | Cam et al. |
| 10,639,134 B2 | 5/2020 | Shanjani et al. |
| 10,743,964 B2 | 8/2020 | Wu et al. |
| 10,758,323 B2 | 9/2020 | Kopelman |
| 10,781,274 B2 | 9/2020 | Liska et al. |
| 10,813,720 B2 | 10/2020 | Grove et al. |
| 10,881,487 B2 | 1/2021 | Cam et al. |
| 10,912,629 B2 | 2/2021 | Tanugula et al. |
| 11,045,283 B2 | 6/2021 | Riley et al. |
| 11,154,382 B2 | 10/2021 | Kopelman et al. |
| 11,166,788 B2 | 11/2021 | Webber |
| 11,174,338 B2 | 11/2021 | Liska et al. |
| 11,219,506 B2 | 1/2022 | Shanjani et al. |
| 11,259,896 B2 | 3/2022 | Matov et al. |
| 11,278,375 B2 | 3/2022 | Wang et al. |
| 11,318,667 B2 | 5/2022 | Mojdeh et al. |
| 11,331,166 B2 | 5/2022 | Morton et al. |
| 11,419,702 B2 | 8/2022 | Sato et al. |
| 11,419,710 B2 | 8/2022 | Mason et al. |
| 11,471,253 B2 | 10/2022 | Venkatasanthanam et al. |
| 11,497,586 B2 | 11/2022 | Kopelman |
| 11,504,214 B2 | 11/2022 | Wu et al. |
| 11,523,881 B2 | 12/2022 | Wang et al. |
| 11,534,268 B2 | 12/2022 | Li et al. |
| 11,534,974 B2 | 12/2022 | O'Leary et al. |
| 11,564,777 B2 | 1/2023 | Kopelman et al. |
| 11,571,278 B2 | 2/2023 | Kopelman et al. |
| 11,571,279 B2 | 2/2023 | Wang et al. |
| 11,576,752 B2 | 2/2023 | Morton et al. |
| 11,589,955 B2 | 2/2023 | Medvinskaya et al. |
| 11,602,414 B2 | 3/2023 | Sato et al. |
| 11,642,194 B2 | 5/2023 | Boronkay et al. |
| 11,642,198 B2 | 5/2023 | Kopelman et al. |
| 11,666,415 B2 | 6/2023 | Wang et al. |
| 2003/0207224 A1 * | 11/2003 | Lotte ............ A61C 7/08 433/6 |
| 2004/0166462 A1 | 8/2004 | Phan et al. |
| 2005/0014105 A1 | 1/2005 | Abolfathi et al. |
| 2005/0244768 A1 | 11/2005 | Taub et al. |
| 2006/0019218 A1 | 1/2006 | Kuo |
| 2006/0078841 A1 | 4/2006 | Desimone et al. |
| 2006/0115782 A1 | 6/2006 | Li et al. |
| 2006/0199142 A1 | 9/2006 | Liu et al. |
| 2008/0160473 A1 | 7/2008 | Li et al. |
| 2008/0286716 A1 | 11/2008 | Sherwood |
| 2008/0286717 A1 | 11/2008 | Sherwood |
| 2009/0280450 A1 | 11/2009 | Kuo |
| 2010/0055635 A1 | 3/2010 | Kakavand |
| 2010/0129763 A1 | 5/2010 | Kuo |
| 2014/0067334 A1 | 3/2014 | Kuo |
| 2015/0079531 A1 * | 3/2015 | Heine ............ A61C 7/08 433/19 |
| 2016/0193014 A1 * | 7/2016 | Morton ............ A61C 7/06 433/24 |
| 2016/0199216 A1 * | 7/2016 | Cam ............ A61F 5/566 128/848 |
| 2016/0310237 A1 * | 10/2016 | Hung ............ A61C 7/002 |
| 2017/0007359 A1 | 1/2017 | Kopelman et al. |
| 2017/0105817 A1 * | 4/2017 | Chun ............ A61C 7/145 |
| 2018/0235731 A1 * | 8/2018 | Hung ............ A61C 7/08 |
| 2018/0303582 A1 * | 10/2018 | Hung ............ A61C 7/08 |
| 2018/0360567 A1 | 12/2018 | Xue et al. |
| 2019/0000592 A1 | 1/2019 | Cam et al. |
| 2019/0000593 A1 | 1/2019 | Cam et al. |
| 2019/0046294 A1 * | 2/2019 | Hung ............ A61C 7/08 |
| 2019/0053877 A1 * | 2/2019 | Hung ............ A61C 7/08 |
| 2019/0099129 A1 | 4/2019 | Kopelman et al. |
| 2019/0099242 A1 * | 4/2019 | Clark ............ A61C 7/18 |
| 2019/0125497 A1 | 5/2019 | Derakhshan et al. |
| 2019/0262101 A1 | 8/2019 | Shanjani et al. |
| 2019/0298494 A1 | 10/2019 | Webber et al. |
| 2020/0000553 A1 | 1/2020 | Makarenkova et al. |
| 2020/0155276 A1 | 5/2020 | Cam et al. |
| 2020/0188062 A1 | 6/2020 | Kopelman et al. |
| 2020/0214598 A1 | 7/2020 | Li et al. |
| 2021/0147672 A1 | 5/2021 | Cole et al. |

\* cited by examiner

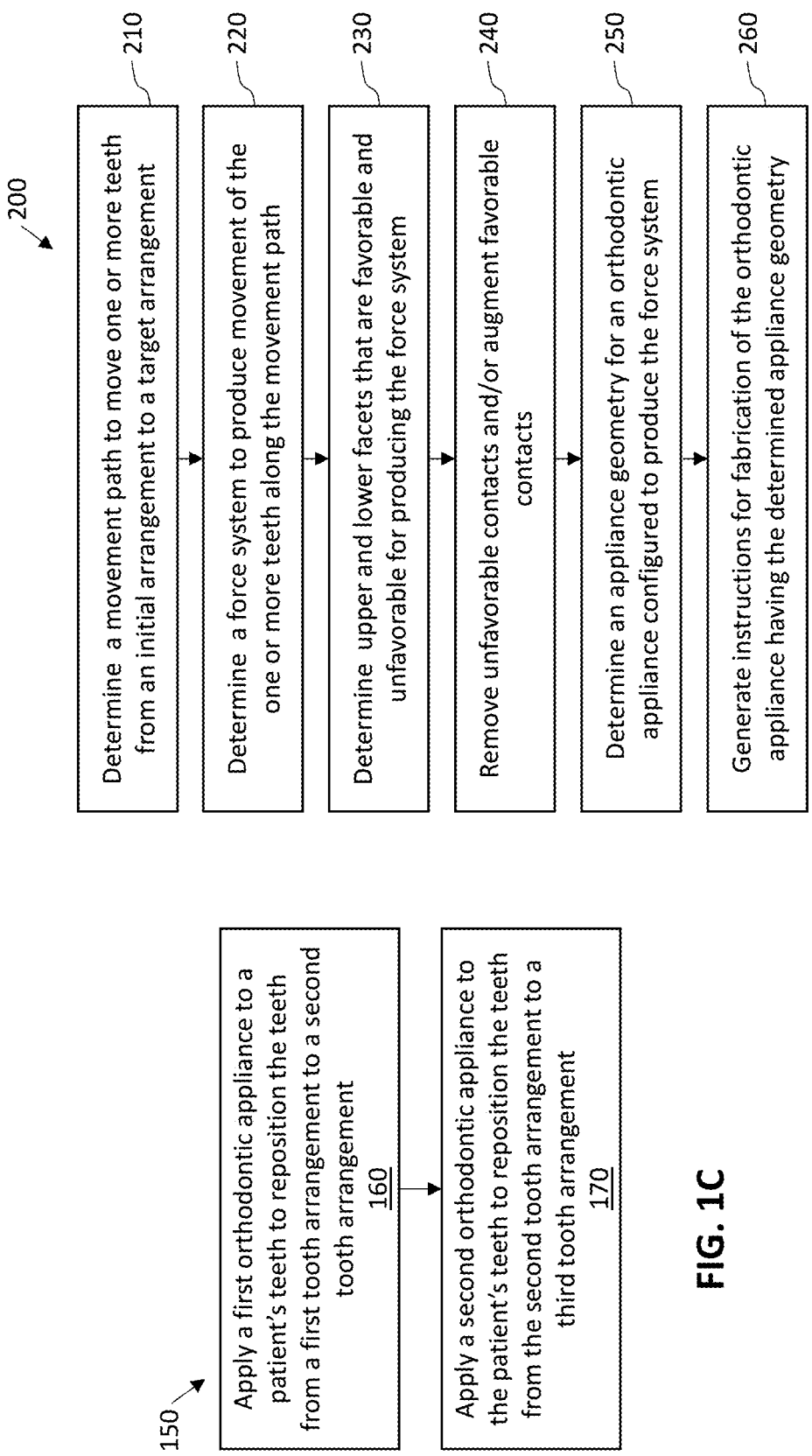

DENTAL APPLIANCE HAVING SELECTIVE OCCLUSAL LOADING AND CONTROLLED INTERCUSPATION

CROSS REFERENCE TO RELATED APPLICATIONS

This patent application is a continuation of U.S. patent application Ser. No. 16/177,067, filed Oct. 31, 2018, titled "DENTAL APPLIANCE HAVING SELECTIVE OCCLUSAL LOADING AND CONTROLLED INTERCUSPATION," now U.S. Pat. No. 11,576,752, which claims priority to U.S. Provisional Patent Application No. 62/579,519, filed Oct. 31, 2017, titled "SELECTIVE OCCLUSAL LOADING FOR ORTHODONTIC TREATMENT," each of which is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

BACKGROUND

Prior methods and apparatus for moving teeth can be less than ideal in at least some respects. Although transparent shell appliances can be effective in moving teeth, the amount of tooth-moving force that can be applied can be limited. For example, the amount of tooth-moving force applied by a transparent shell appliance may depend on the elasticity of the appliance shell and the amount of displacement of a tooth-moving cavity relative to a patient's tooth. Manufacturing transparent shell appliances to apply large tooth-moving forces can be impractical, as the required positions of teeth-receiving cavities may involve a displacement relative to the positions of the patient's teeth such that the appliance may become somewhat difficult or uncomfortable to wear in some instances. While using different materials for a shell appliance can reduce this effect to some degree, the ability to apply force to teeth can be somewhat limited. It may be helpful to exploit additional forces within the patient's mouth, in order to enhance the tooth-moving forces applied by transparent shell appliances.

A source of additional force in a patient's mouth that may have been less than ideally utilized with prior methods and apparatus is the bite force. The bite force of a healthy individual can be strong when compared with that applied by an orthodontic appliance such as a transparent shell appliance in at least some instances. Prior approaches to addressing bite force have suggested that bite forces cannot be effectively exploited for orthodontic adjustments of teeth in at least some instances. For example, prior work has suggested that tooth loading between occlusal surfaces can produce undesirable loading on the opposing tooth. Prior approaches have less than ideally addressed the complex relationships between the loads on the teeth and crown-crown occlusal contacts. Some authors have pointed to difficulties controlling tooth loading, such as Thomas Katona in "An engineering analysis of dental occlusion principles," for example. The prior methods and apparatus have not fully addressed occlusal forces, which can reduce the ability of an orthodontic appliance to control the movement of teeth, in some cases rendering such appliances less effective.

Patients with different skeletal structures exhibit different levels of bite force. In general, patients with brachyocephalic skeletal structures (jaws with large width and flat mandibular plane angles) typically have very high bite forces. Traditional orthodontic treatment can be more difficult to achieve with these patients than those presenting with a dolichofacial skeletal structure (narrow, long face with high mandibular plane angle). This can be related to the orientation of the jaw muscles applying the force to the movement direction of the jaw and the hinge axis, which can impede tooth movement required for orthodontic treatment in at least some instances.

The forces of occlusion are the result of contact between the occlusal surfaces of teeth in the opposing arch and the force applied by the facial musculature when the jaws are closed (occluded). Prior shell appliances have not adequately controlled such forces essentially in at least some instances. Orthodontic treatment with fixed appliances (brackets bonded to the teeth and wires engaged in the bracket to apply force) also may fail to control the occurrence of these contacts (e.g., contacts between facets of opposing teeth), and the magnitude and direction of the force can be an uncontrolled variable in at least some instances. In a typical shell appliance, the occlusal surface can be formed to mimic the shape of the occlusal surfaces of the teeth, adding a thin layer of material while offsetting these occlusal surfaces, which can also result in a less than ideally controlled magnitude and direction of bite forces.

In addition, many shell aligners do not adjust or account for intercuspation with the occlusive surface of the opposite jaws. Thus, the patient may experience uncomfortable intercuspation, particularly at early stages in the alignment.

In light of the above, improved methods and apparatus are needed that overcome at least some of the aforementioned limitations of the prior art. Ideally, these improved methods and apparatus would exploit occlusal forces in a controlled manner to provide and enhance tooth-moving forces applied to the teeth.

SUMMARY OF THE DISCLOSURE

Methods and apparatus are provided for improved orthodontic treatment that can use bite forces to produce tooth movement, such as with transparent polymeric shell appliances. In some embodiments, a structure on a shell appliance modifies an occlusal surface of a patient's teeth with the appliance placed thereon. Individual facets of a patient's teeth can be identified and selected for modification based on the occlusion forces provided when a patient bites. An appliance can be constructed with a feature at a location on the appliance sized and shaped to provide beneficial forces to the tooth when the patient bites. Facets with favorable occlusion forces can have the corresponding shell surface locally augmented, and the greater amount of protrusion can increase the applied bite force for those facets. Facets with unfavorable occlusion forces can have the corresponding shell surface configured to reduce these unfavorable forces, and can be configured to shift forces away from the facet over a wider area. While this can be achieved in many ways, in some embodiments the appliance comprises a bubble structure that decreases local forces for that facet. For example, the bubble structure can comprise a portion of a shell shaped to provide a gap between the inner surface of the shell and parts of the patient's tooth, thereby decreasing the occlusal forces applied to those parts of the patient's tooth. These surface modifications can be used to redirect bite forces to provide force along a desired movement direction, so as to urge teeth more effectively along a trajectory from an initial position to a final position of a planned treatment with a plurality of appliances. The forces can optionally be combined with other orthodontic forces to increase total available tooth-moving force for an appliance, such as an appliance among a plurality of appliances of a planned treatment. The size, shape and location of the features can be adjusted among the plurality of appliances as the treatment progresses in order to appropriately adjust amounts of occlusal forces applied to the teeth.

Thus, any of the apparatuses (e.g., devices or systems, including dental/orthodontic devices or systems, such as dental/orthodontic aligners) described herein may be configured to selectively intercuspate with the patient's teeth on a jaw (e.g., dental arch) that is opposite to the jaw on which the aligner is worn or a second aligner worn on the patient's teeth of the opposite jaw.

In some variations, the selective intercuspation may be configured to maximally intercuspate. In some variations, the selective intercuspation may apply a force (referred to herein as a bite force) when the patient wearing the apparatus bites and intercuspates; the bite force is typically configured to complement, modify, amplify, adjust, etc. the force applied to reposition one or more of the patient's teeth. In this manner, the selective intercuspation, by adjusting the patient's intercuspation, may make use of the force of biting to enhance the alignment of the patient's teeth; without the apparatuses and methods described herein the bite force may instead oppose the alignment of the patient's teeth and/or may lead to undesirable forces that may move or retard movement of the patient's teeth in an undesirable manner.

For example, described herein are apparatuses such as dental aligner devices (which may be referred to as orthodontic devices, orthodontic aligners, or simply aligners) to be worn on a patient's teeth, the device comprising: a shell body having a lingual side, an occlusal side, and a buccal side, wherein the shell body comprises an inner tooth-receiving region configured to fit over the patient's teeth and to apply a force to move one or more of the patient's teeth to a predetermined configuration when the shell body is worn on the patient's teeth, the inner tooth-receiving region comprising: an occlusal inner surface contour in the inner tooth-receiving region, the occlusal inner surface having an arrangement of chambers configured to conform to a first arrangement of cusps corresponding to an occlusal surface of the patient's teeth, and an occlusal outer surface contour that is opposite the occlusal inner surface contour, the occlusal outer surface contour forming a second arrangement of cusps, wherein the second arrangement of cusps of the occlusal outer surface contour does not align with the first arrangement of cusps when the occlusal inner surface is worn over the first arrangement of cusps, so that intercuspation of the patient's teeth when wearing the dental aligner device produces a bite force to move the one or more of the patient's teeth to the predetermined configuration.

The shell aligners described herein may fit over the patient's teeth so that force may be applied to and against one or more of the patient's teeth to move the one or more teeth (translation, rotation, etc.) toward a predetermined configuration. In addition, the shell aligner may include spaces (e.g., gaps) between the inner surface of the shell aligner and the teeth to guide the tooth movement, providing a lower-resistance path for movement. Thus, the apparatuses (e.g., shell aligners) described herein may be configured to apply a force to move one or more of the patient's teeth to a predetermined configuration.

The bite force may be configured to apply force in the same or a complementary direction as the force applied by the aligner when worn over the teeth (e.g., without intercuspation/biting). For example, the bite force may be oriented to urge the one or more of the patient's teeth along a vector with a vector component in a plane orthogonal to a second tooth's coronoapical axis, wherein the second tooth is opposite from the one or more of the patient's teeth and on a dental arch that is opposite from the dental arch of the one or more of the patient's teeth in the patient's mouth.

The dental aligner of claim 1, wherein the occlusal outer surface is configured to selectively intercuspate with the opposite jaw (or a second aligner worn on the opposite dental arch/jaw). For example, in some variations the dental aligner may be configured to maximally intercuspate with an occlusal surface the patient's opposite jaw, such as the teeth on the opposite jaw or a second dental aligner worn on the opposite jaw. Alternatively or additionally, in some variations, the dental aligner may be configured to selectively intercuspate so that the occlusal outer surface is configured to intercuspate with over more than 90% of the occlusal surface of the patient's opposite jaw.

As mentioned, the occlusal surface on the patient's opposite jaw may be a dental appliance configured to be worn on teeth of the patient's opposite jaw, or it may be the teeth of the patient's opposite jaw (without an aligner worn on them).

In some variations, the second arrangement of cusps of the occlusal outer surface contour may correspond to a target final arrangement of an occlusal surface of a treatment plan. This may allow the patient the feel and/or look of the final intercuspation position of the teeth, as will be described in more detail below.

In some variations, one or more regions of the occlusal outer surface contour is laterally offset in an occlusal plane relative to the occlusal inner surface contour.

Any of the apparatuses described herein may include an occlusal surface feature protruding from the occlusal outer surface in a direction away from the inner tooth-receiving region, wherein the occlusal surface feature is positioned to be apply the bite force. Thus, in general, the occlusal outer surface of the individual teeth may not be identical to the occlusal outer surface of the patient's teeth, but may include additional protrusions and/or gaps to apply force (bite force).

Any of the dental aligners and/or methods described herein may be configured so that intercuspation of the patient's teeth when wearing the dental aligner device produces a bite force to move the one or more of the patient's teeth to the predetermined configuration to maintain the relationship between the upper and lower jaws (e.g., to increase contact between cusps of the patient's upper jaw and lower jaw).

Alternatively or additionally, any of the devices and methods described herein may be configured so that intercuspation of the patient's teeth when wearing the dental aligner device produces a bite force to move the one or more of the patient's teeth to the predetermined configuration to modify condylar loading of the temporomandibular joint (TMJ). For example, any of these methods may be configured to decrease condylar loading; alternatively in some variations the methods may be configured to increase condylar loading.

Also described herein are methods of moving (e.g., aligning and/or realigning) a patient's teeth using an orthodontic/dental apparatus including those having selective intercuspation. For example, described herein are methods of aligning a patient's teeth using one or more a dental aligners, wherein each dental aligner includes a shell body having a lingual side, an occlusal side, and a buccal side, wherein the shell body comprises an inner tooth-receiving region. These methods may include: applying a first force to move one or more of the patient's teeth to a predetermined configuration when the shell body is worn on the patient's teeth so that patient's teeth are received in an inner tooth-receiving region of the shell body having an occlusal inner surface contour configured to fit a first arrangement of cusps corresponding to an occlusal surface of the patient's teeth; and applying a bite force to move the one or more of the patient's teeth to the predetermined configuration when the patient bites on the shell body to intercuspate against an occlusal outer surface contour that is opposite the occlusal inner surface contour, wherein the occlusal outer surface contour forms a second arrangement of cusps that does not align with the first arrangement of cusps when the occlusal inner surface is worn over the first arrangement of cusps.

Applying the bite force may comprise applying the bite force which is oriented to urge the one or more of the patient's teeth along a vector with a vector component in a plane orthogonal to a second tooth's coronoapical axis, wherein the second tooth is opposite from the one or more of the patient's teeth and on a dental arch that is opposite from the dental arch of the one or more of the patient's teeth in the patient's mouth. In some variations applying the first force comprises attaching the shell body to the patient's teeth using one or more attachments bonded to the patient's teeth. Applying the bite force may comprise intercuspating against a second shell aligner worn on a dental arch opposite to a dental arch on which the shell body is worn.

In some variations applying the bite force comprises intercuspating against a second group of the patient's teeth on a dental arch opposite to a dental arch on which the shell body is worn. Applying the bite force may comprise intercuspating against a protrusion on the occlusal outer surface contour. In some variations applying the bite force comprises intercuspating with over more than 90% of the occlusal surface of the patient's opposite jaw.

Also described herein are methods and apparatuses having selective intercuspation that may or may not adjust the bite force. For example, described herein are dental aligner systems to be worn on a patient's teeth as part of a treatment plan to align the patient's teeth that include: a plurality of dental aligners configured to be worn in a sequence defined by the treatment plan; wherein each dental aligner comprises a shell body having an inner tooth-receiving region configured to fit over the patient's teeth and apply force to move one or more of the patients teeth when worn, wherein the inner tooth-receiving region comprises an occlusal inner surface contour, and wherein each dental aligner further comprises an occlusal outer surface contour that is opposite the occlusal inner surface contour; wherein all of the dental aligners in the plurality of dental aligners have different occlusal inner surface contours, but two or more of the dental aligners in the plurality of dental aligners have identical occlusal outer surface contours.

The two or more of the dental aligners in the plurality of dental aligners may have identical occlusal outer surface contours are configured so that the occlusal outer surfaces maximally intercuspate with an occlusal surface the patient's opposite jaw. The two or more of the dental aligners in the plurality of dental aligners that have identical occlusal outer surface contours may be configured so that the occlusal outer surfaces intercuspate with over more than 90% of the occlusal surface of the patient's opposite jaw. In some variations, the two or more of the dental aligners in the plurality of dental aligners may have identical occlusal outer surface contours correspond to a target final arrangement of an occlusal surface of a treatment plan. The two or more of the dental aligners in the plurality of dental aligners may comprise one or more regions of the occlusal outer surface contour that is laterally offset in an occlusal plane relative to the occlusal inner surface contour.

The two or more of the dental aligners in the plurality of dental aligners may further comprise an occlusal surface feature protruding from the occlusal outer surface in a direction away from the inner tooth-receiving region, wherein the occlusal surface feature is positioned to be apply a bite force to a first tooth received by the inner tooth-receiving region and to a second tooth, wherein the second tooth is opposite from the one or more of the patient's teeth and on a dental arch that is opposite from the dental arch of the one or more of the patient's teeth in the patient's mouth.

An appliance for applying tooth moving forces to teeth of a patient may include: a first shell having a plurality of teeth-receiving cavities shaped to receive the teeth of a patient; and a first occlusal surface feature disposed on an occlusal surface of a first tooth-receiving cavity of the plurality of teeth receiving cavities and protruding from the occlusal surface in a direction away from the first tooth-receiving cavity, wherein said first occlusal surface feature is positioned to apply a force to a first tooth received by the first tooth-receiving cavity and a second tooth opposite the first tooth-receiving cavity in the patient's mouth.

The first occlusal surface feature may be positioned to apply the force when the patient bites while wearing the appliance.

In general, a plurality of appliances configured to move the teeth of the patient from an initial arrangement to a target arrangement when worn in sequence may include any of appliances as described above. The first appliance may be configured to receive the teeth of the patient in the initial arrangement. A second appliance of the plurality of appliances may comprise a second shell configured to receive at least the first tooth when the teeth of the patient are in an intermediate arrangement subsequent to the initial arrangement, said second shell may comprise a second occlusal surface feature positioned to apply a second force to the first tooth and the second tooth, said second force differing from the first force in at least one of magnitude, direction, location on the first tooth, or location on the second tooth. The second occlusal surface feature may differ in shape from the first occlusal surface feature. The first occlusal surface feature may be located on the occlusal surface of the first tooth-receiving cavity at a position corresponding to a facet of the first tooth. For example, the first occlusal surface may comprise a solid protrusion positioned to cover at least a portion of the facet of the first tooth. The first occlusal surface may comprise pinched or folded shell material positioned to cover at least a portion of the facet of the first tooth. The first occlusal surface feature may be arranged to directly contact the second tooth when the appliance is worn and the patient bites, thereby applying a bite force to the second tooth.

The bite force applied to the second tooth may be oriented to urge a tooth movement along a vector with a vector component in a plane orthogonal to the second tooth's coronoapical axis.

Any of these apparatuses (e.g., systems) may include a second shell with a second plurality of tooth-receiving cavities configured to receive a plurality of teeth, said second plurality of tooth-receiving cavities may include a second tooth-receiving cavity configured to receive the second tooth.

Any of these apparatuses may include a second occlusal surface feature on an occlusal surface of the second tooth-receiving cavity, said second occlusal surface feature configured to apply a force to the first tooth-receiving cavity when the patient bites while wearing the appliance. The first and second occlusal surface features may be configured to contact each other when the patient bites while wearing the appliance.

The occlusal surface of the first tooth-receiving cavity may comprises a bubble structure disposed to receive at least one facet of the first tooth, and shaped to provide a space between the first tooth and the first tooth-receiving cavity when the appliance is worn, thereby reducing bite force applied to at least part of the at least one facet.

The first and second teeth may be posterior teeth (e.g., molars, pre-molars). The occlusal surface of a first tooth-receiving cavity may comprise a plurality of occlusal surface features including the first occlusal feature, said plurality of occlusal surface features may be configured to provide a plurality of forces to the second tooth when the patient bites, said plurality of forces may provide a net force on the second tooth to urge the second tooth along a desired movement path.

Also described herein are methods of orthodontic treatment and/or methods of designing a treatment plan (e.g., orthodontic treatment plan) that may include: obtaining a representation of a patient's dentition, said representation including bite information for a plurality of the patient's teeth; determining a movement path to move one or more teeth from an initial arrangement to a target arrangement; determining a first facet on a first tooth of a first arch and a second facet on a second tooth of a second arch, wherein said bite information indicates that said first tooth and second tooth come into occlusion when the patient bites; and determining an appliance geometry for an orthodontic appliance configured to move the one or more teeth along the movement path, wherein the appliance geometry includes a first shell including a first tooth-receiving cavity to receive the first tooth, said first tooth-receiving cavity comprising an occlusal surface feature at a location corresponding to the first facet of the first tooth and protruding away from the first tooth-receiving cavity.

Obtaining a representation of a patient's dentition may comprise scanning the teeth of the patient, and/or obtaining a mold of the patient's dentition.

Any of these methods may include outputting instructions to fabricating an appliance based on the appliance geometry, and/or fabricating the appliance. For example, fabricating the appliance may comprise thermoforming over a positive or negative mold. Fabricating the appliance may include using direct fabrication to manufacture the appliance.

The methods may include generating a plurality of appliance geometries for a plurality of appliances, said appliances configured to be worn by the patient in sequence to move the teeth of the patient from an initial configuration to a final configuration. The appliance geometry may further comprise a second shell, said second shell comprising a second tooth receiving cavity to receive the second tooth. For example, the second tooth receiving cavity may comprise a second occlusal surface feature a location corresponding to the second facet of the second tooth and protruding away from the second tooth-receiving cavity, said second occlusal surface feature configured to apply a force to the first tooth-receiving cavity when the patient bites while wearing the appliance. The first tooth-receiving cavity may further comprise a bubble structure disposed to receive at least one facet of the first tooth other than the first facet, and shaped to provide a space between the first tooth and the first tooth-receiving cavity when the appliance is worn, thereby reducing bite force applied to at least part of the at least one facet.

Any of the methods described herein may be configured as a system for use in orthodontic treatment that includes one or more processors and non-transitory memory containing instructions that, when executed, cause the processor to perform the method.

The dental appliances described herein, e.g., dental aligners, typically fit over a patient's teeth and include an occlusal outer surface contour that at least partially matches and selectively intercuspates with the outer occlusal outer surface contour of the opposite jaw. In particular, described herein are dental appliances having an occlusal outer surface contours that are distinct, and in some cases laterally (e.g., in the plane of the occlusal surface) offset from, the occlusal inner surface contour within the dental appliance. This may result in a "faux" occlusal outer surface contour of the appliance that does not match the occlusal outer surface contour of the patient's teeth when not wearing the appliance. Thus, the occlusal outer surface contour of the appliance may be configured to intercuspate with the opposite jaw, e.g., the occlusal surface of the patient's teeth and/or the occlusal outer surface contour of an appliance worn on the patient's teeth on the opposite jaw. In some cases the occlusal outer surface contour of the appliance may be configured to provide a target intercuspation with the opposite jaw, even during initial or intermediate stages of a dental (e.g., orthodontic) treatment. The target intercuspation may be a maximal (or near maximal) intercuspation. The target intercuspation may be the intended final intercuspation position from a pre-defined treatment plant. This may enhance the comfort for the patient, and may allow the patient to acclimate to the final (or near-final) intercuspation earlier in treatment. For example, the occlusal outer surface contour of all or some of the appliance in a series of appliances may be configured to match the target occlusal outer surface contour at the final stages of the treatment defined by the treatment plan; the occlusal inner surface contour, which is worn against the teeth, may therefore be different for the dental appliances, and may change across different stage of the treatment plan.

In general, rather than following the contours of the occlusal surface(s) of the teeth over which the dental appliance is configured to fit onto, the dental appliance descried herein may have a different occlusal outer surface contour (e.g., having cusps and fossae/grooves) compared to the occlusal surface contour of the teeth the appliance is covering. The occlusal outer surface contour may be rearranged to form a new configuration, and/or some portions may be laterally offset (in the plane of the occlusal surface) compared to patient's teeth.

As used here "intercuspation" may refer to the cusp-to-fossa relationship of the outer surfaces of the teeth, and particularly the maxillary and mandibular posterior teeth to each other. This may also be referred to as the interlocking or fitting together of the occlusal eminences (e.g., cusps) on the outer surfaces of the teeth with the opposite outer surfaces on the teeth (e.g., between opposite cusp regions and into opposite fossae. Intercuspation may refer to the relationship between the outer (occlusive) surfaces of one or more dental appliance(s) worn on the teeth and either their relationship with an opposite outer (occlusive) surface of one or more dental appliance(s) worn on the opposite jaw, and/or with the patient's teeth on the opposite jaw. Thus, in general, intercuspation may refer to the interlocking or fitting together of the opposing occlusal outer surface contours of an appliance worn on the teeth and another appliance and/or the patient's occlusal surface on the opposite jaw. Selective intercuspation may refer to the modification of the intercuspation in order to direct and/or adjust the bite force selectively to enhance movement (e.g., alignment/realignment which may include translation and/or rotation) of one (or in some cases more than one) of the patient's teeth. This movement may be according to a predetermined treatment plan for achieving a final or intermediate configuration of the patient's teeth that has desirable clinical and/or aesthetic properties.

The occlusal outer surface contour of a dental appliance, which may be referred to as the outward-facing occlusal surface contour or as the outward-facing occlusal surface of the dental appliance, may refer to the outermost contour of the appliance, and may be distinguished from the inward-facing occlusal surface contour (or inward-facing occlusal surface) of the dental appliance. The inward-facing occlusal surface contour of the dental appliance may face the occlusal surface of the teeth onto which the appliance is worn. In some variation the inward-facing occlusal surface contour of the appliance is offset from the outward-facing occlusal surface contour. Thus, the thickness of the occlusal surface may vary across the cross-section along the occlusal portion for the appliance. In some variations, the inward-facing occlusal surface contour is configured so that applies a force or moment to one or more tooth/teeth to modify the position of the tooth/teeth. As described herein, in some variations the outward-facing occlusal surface contour may be configured to apply a force or moment to one or more teeth on the opposite jaw. Alternatively or additionally, the outward-facing occlusal surface contour may be configured to maximally intercuspate with the occlusal surface on the opposite jaw.

Maximal or maximum intercuspation may refer to an arrangement in which all or virtually all (e.g., >85%, >87%, >90%, >92%, >95%, >97%, >99%) of the outward-facing occlusal outer surface contours on the teeth (e.g., the occlusal eminences and fossae of a dental apparatus worn on the teeth) fully interpose with the outermost protruding surface contours on the teeth (e.g., of the teeth or of a dental appliance worn on the teeth) of the opposing arch. Maximal intercuspation may be important for jaw position and patient comfort, as it may help define both the anterior-posterior and lateral relationships of the mandible and the maxilla, as well as the superior-inferior relationship (e.g., the vertical dimension of occlusion).

For example, described herein are dental aligner device to be worn on a patient's teeth, the device comprising: a shell body having a lingual side, an occlusal side, and a buccal side, wherein the shell body comprises an inner tooth-receiving region configured to fit over the patient's teeth, the inner tooth-receiving region comprising: an occlusal inner surface contour in the inner tooth-receiving region, the occlusal inner surface having an arrangement of cavities configured to conform to a first arrangement of cusps on an occlusal surface of the patient's teeth, and an occlusal outer surface contour that is opposite the occlusal inner surface, the occlusal outer surface contour forming a second arrangement of cusps, wherein the second arrangement of cusps of the occlusal outer surface contour does not align with the arrangement of cavities of the occlusal inner surface contour, and wherein a thickness between the occlusal outer surface contour and the occlusal inner surface contour varies across the shell body occlusal side.

Also described herein are dental aligner devices to be worn on a patient's teeth that include: a shell body having a lingual side, an occlusal side, a buccal side and a thickness, wherein the shell body comprises: an inner tooth-receiving region configured to fit over the patient's teeth, the inner tooth-receiving region comprising an occlusal inner surface contour comprising a plurality of cavities that conform to a plurality of cusps on an occlusal surface of the patient's teeth; and an occlusal outer surface contour that is on opposite from the inner occlusal surface contour, wherein the occlusal outer surface contour forms a second plurality of cusps, wherein at least some of the second plurality of cusps are laterally offset from the plurality of cavities of the occlusal inner surface contour, and wherein a thickness between the occlusal outer surface contour and the occlusal inner surface contour varies across the shell body occlusal side.

In any of these apparatuses (e.g., devices, systems, etc.), the occlusal outer surface may be configured to maximally intercuspate with an occlusal surface the patient's opposite jaw. For example, the occlusal outer surface may be configured to intercuspate with over more than 90% of the occlusal surface of the patient's opposite jaw. The occlusal surface on the patient's opposite jaw may be a dental appliance (e.g., an aligner, retainer, palatal expander, etc.) configured to be worn on teeth of the patient's opposite jaw. The occlusal surface on the patient's opposite jaw may be the occlusal surface of the patient's teeth in the opposite jaw.

The occlusal outer surface contour may correspond to the final or near-final configuration of the occlusal surface that is to be achieved by the aligner (or a series of aligners including the aligner). The second arrangement of cusps of the outer surface contour may correspond to a target final arrangement of an occlusal surface of a treatment plan.

The occlusal inner surface contour may be configured to apply force to move one or more of a patient's teeth while wearing the dental aligner.

In any of these variations described herein, one or more regions of the occlusal outer surface contour may be laterally offset in an occlusal plane relative to the occlusal inner surface.

Any of these apparatuses may include one or more occlusal surface features protruding from the occlusal outer surface in a direction away from the inner tooth-receiving region, wherein the occlusal surface feature is positioned to be apply a force to a first tooth received by the inner tooth-receiving region and to a second tooth opposite the inner tooth-receiving region in the patient's mouth.

Also described herein are systems including a series of aligners to be worn to align a patient's teeth in which the intercuspation of the aligners is controlled or modified, e.g., to maximize intercuspation and/or to mimic the final intercuspation at or near the end of the treatment to align the teeth, even during earlier stages of the treatment plan.

For example, a dental aligner system to be worn on a patient's teeth as part of a treatment plan to align the patient's teeth may include: a plurality of dental aligners configured to be worn in a sequence defined by the treatment plan; wherein each dental aligner comprises a shell body having an inner tooth-receiving region configured to fit over the patient's teeth and apply force to move one or more of the patients teeth when worn, wherein the inner tooth-receiving region comprises an occlusal inner surface contour, and wherein each dental aligner further comprises an occlusal outer surface contour that is opposite the occlusal inner surface contour; wherein all of the dental aligners in the plurality of dental aligners have different occlusal inner surface contours, but two or more of the dental aligners in the plurality of dental aligners have identical occlusal outer surface contours.

The two or more of the dental aligners in the plurality of dental aligners that have identical occlusal outer surface contours may be configured so that the occlusal outer surfaces maximally intercuspate with an occlusal surface the patient's opposite jaw. For example, the two or more dental aligners in the plurality of dental aligners that have identical occlusal outer surface contours may be configured so that the occlusal outer surfaces intercuspate with over more than 90% of the occlusal surface of the patient's opposite jaw. The two or more dental aligners in the plurality of dental aligners that have identical occlusal outer surface contours may correspond to a target final arrangement of an occlusal surface of a treatment plan. The two or more dental aligners in the plurality of dental aligners may comprise one or more regions of the occlusal outer surface contour that are laterally offset in an occlusal plane relative to the occlusal inner surface. In some variations, the two or more dental aligners in the plurality of dental aligners may further comprise an occlusal surface feature protruding from the occlusal outer surface in a direction away from the inner tooth-receiving region, wherein the occlusal surface feature is positioned to be apply a force to a first tooth received by the inner tooth-receiving region and to a second tooth opposite the inner tooth-receiving region in the patient's mouth.

In general, a dental aligner device may be configured to include a projection on the occlusal surface that is configured to apply force to move a tooth on the opposite dental arch (opposite from the arch over which the aligner is being worn). The projection may be referred to as an occlusal surface feature. The projection may be in addition to the cusps mimicking the cusps of the teeth over which the dental arch is being worn, and/or they may be modified forms of the cusps mimicking the teeth over which the dental arch is being worn. For example, the occlusal surface feature may be one or more cusps (and or cusps and nadir regions) that are shifted relative to the underlying cusp(s) or cusps and nadirs of the tooth/teeth underlying the aligner when it is worn. In some variations the occlusal surface feature is an enlarged cusp or a bump or protrusion extending from a cusp (or other region of the occlusal outer surface). In variations in which the occlusal surface feature is a bump or protrusion, it may be relatively small, so that it engages with the opposite teeth (or an aligner on the opposite teeth) only when the majority of the teeth are otherwise engaged (e.g., when the aligner intercuspates with over a x % of the of the occlusal surface of the opposite dental arch, X % may be 50%, 60%, 70%, 80%, 90%, etc.). For example, the occlusal surface feature may extend between about 0.1 mm and 3 mm (e.g., less than about 3 mm, less than about 2.5 mm, less than about 2 mm, less than about 1.8 mm, less than about 1.7 mm, less than about 1.5 mm, less than about 1.4 mm, less than about 1.3 mm, less than about 1.2 mm, less than about 1.1 mm, less than about 1.0 mm, less than about 0.9 mm, etc.) above the outer occlusal surface. The occlusal surface feature may have a maximum diameter of between about 0.1 mm and about 3 mm (e.g., less than about 3 mm, less than about 2.5 mm, less than about 2 mm, less than about 1.8 mm, less than about 1.7 mm, less than about 1.5 mm, less than about 1.4 mm, less than about 1.3 mm, less than about 1.2 mm, less than about 1.1 mm, less than about 1.0 mm, less than about 0.9 mm, etc.). The occlusal surface feature may be have an approximately hemispherical shape, a rectangular shape, a pyramidal shape, an oval shape, a cylindrical shape, etc. In some variations the occlusal surface feature is a rounded shape having smoothed edges extending from the outer occlusal surface. The occlusal surface feature may be in addition to the cusps (and nadirs) that are also present in the configuration of the inner occlusal surface.

For example, a dental aligner device to be worn on a patient's teeth over a first dental arch may include: a shell body having a lingual side, an occlusal side, and a buccal side, wherein the shell body comprises an inner tooth-receiving region to fit over the patient's teeth and apply a force to move one or more of the patient's teeth on an opposite dental arch to a predetermined configuration when the shell body is worn on the patient's teeth, the inner tooth-receiving region comprising: an occlusal inner surface contour in the inner tooth-receiving region, the occlusal inner surface having a first arrangement of cusps and nadirs configured to conform to an occlusal surface of the patient's teeth, an occlusal outer surface contour that is opposite the occlusal inner surface contour, the occlusal outer surface contour forming a second arrangement of cusps, wherein the first arrangement of cusps includes the same number and sequence order of cusps; and one or more occlusal surface feature extending from the outer occlusal surface, configured so that the occlusal surface feature of the dental aligner device produces a bite force to move the one or more of the patient's teeth on the opposite dental arch to the predetermined configuration when the dental aligner device is worn on the first dental arch.

Alternatively or additionally, a dental aligner device as described herein (e.g., a dental aligner to be worn on a patient's teeth over a first dental arch) may include: a shell body having a lingual side, an occlusal side, and a buccal side, wherein the shell body comprises an inner tooth-receiving region to fit over the patient's teeth and apply a force to move one or more of the patient's teeth on an opposite dental arch to a predetermined configuration when the shell body is worn on the patient's teeth, the inner tooth-receiving region comprising: an occlusal inner surface contour in the inner tooth-receiving region, the occlusal inner surface having a first arrangement of cusps and nadirs configured to conform to an occlusal surface of the patient's teeth, and an occlusal outer surface contour that is opposite the occlusal inner surface contour, the occlusal outer surface contour forming a second arrangement of cusps and nadirs, wherein the second arrangement of cusps and nadirs of the occlusal outer surface contour does not align with the first arrangement of cusps and nadirs, so that the dental aligner device produces a bite force to move the one or more of the patient's teeth on the opposite dental arch to the predetermined configuration when the dental aligner device is worn on the first dental arch.

One or more regions of the occlusal outer surface contour may be offset in an occlusal plane relative to the occlusal inner surface contour. The occlusal inner surface contour and the occlusal outer surface contour may have the same number and sequence order of cusps and nadirs, but the spacing between one or more adjacent cusps and nadirs are different between the occlusal inner surface contour and the occlusal outer surface contour. The second arrangement of cusps and nadirs of the occlusal outer surface contour may correspond to a target final arrangement of an occlusal surface of a treatment plan.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIG. 1C illustrates one example of a method of orthodontic treatment using a plurality of appliances;

FIG. 2 illustrates one example of a method for designing an orthodontic appliance;

DETAILED DESCRIPTION

The methods and apparatus disclosed herein can be used in many ways to improve the treatment of teeth with occlusal forces. The methods and apparatus disclosed herein can be incorporated into and combined with many prior approaches to moving teeth, such as thin shell appliances ("aligners"), for example. Although reference is made to occlusal forces with shell appliances, the methods and apparatus disclosed herein can be combined with many prior approaches to moving teeth such as attachments, brackets and wires.

As used herein the terms "torque" and "moment" are treated synonymously, and encompass a force acting on an object such as a tooth at a distance from a center of resistance. The moment may be calculated with a vector cross product of a vector force applied to a location corresponding to a displacement vector from the center of resistance, for example. The moment may comprise a vector pointing in a direction. A moment opposing another moment may encompass one of the moment vectors oriented toward a first side of the object such as the tooth and the other moment vector oriented toward an opposite side of the object such as tooth, for example.

In many embodiments, one or more posterior teeth comprises one or more of a molar or a premolar or a canine, and one or more anterior teeth comprising one or more of a central incisor, a lateral incisor, a cusped, a first bicuspid or a second bicuspid.

The embodiments disclosed herein are well suited for combination with one or more known commercially available tooth moving components such as attachments and polymeric shell appliances. In many embodiments, the appliance and one or more attachments are configured to move one or more teeth along a tooth movement vector comprising six degrees of freedom, in which three degrees of freedom are rotational and three degrees of freedom are translation. Embodiments disclosed herein can provide differential moment vectors based on a moment and a counter moment to each of a plurality of teeth.

The present disclosure provides orthodontic systems and related methods for designing and providing improved or more effective tooth moving systems for eliciting a desired tooth movement and/or repositioning teeth into a desired arrangement.

Although reference is made to an appliance comprising a polymeric shell appliance, the embodiments disclosed herein are well suited for use with many appliances that receive teeth, for example appliances without one or more of polymers or shells. The appliance can be fabricated with one or more of many materials such as metal, glass, reinforced fibers, carbon fiber, composites, reinforced composites, aluminum, biological materials, and combinations thereof for example. The appliance can be shaped in many ways, such as with thermoforming or direct fabrication. Alternatively or in combination, the appliance can be fabricated with machining such as an appliance fabricated from a block of material with computer numeric control machining.

Figures 1A, 1B:
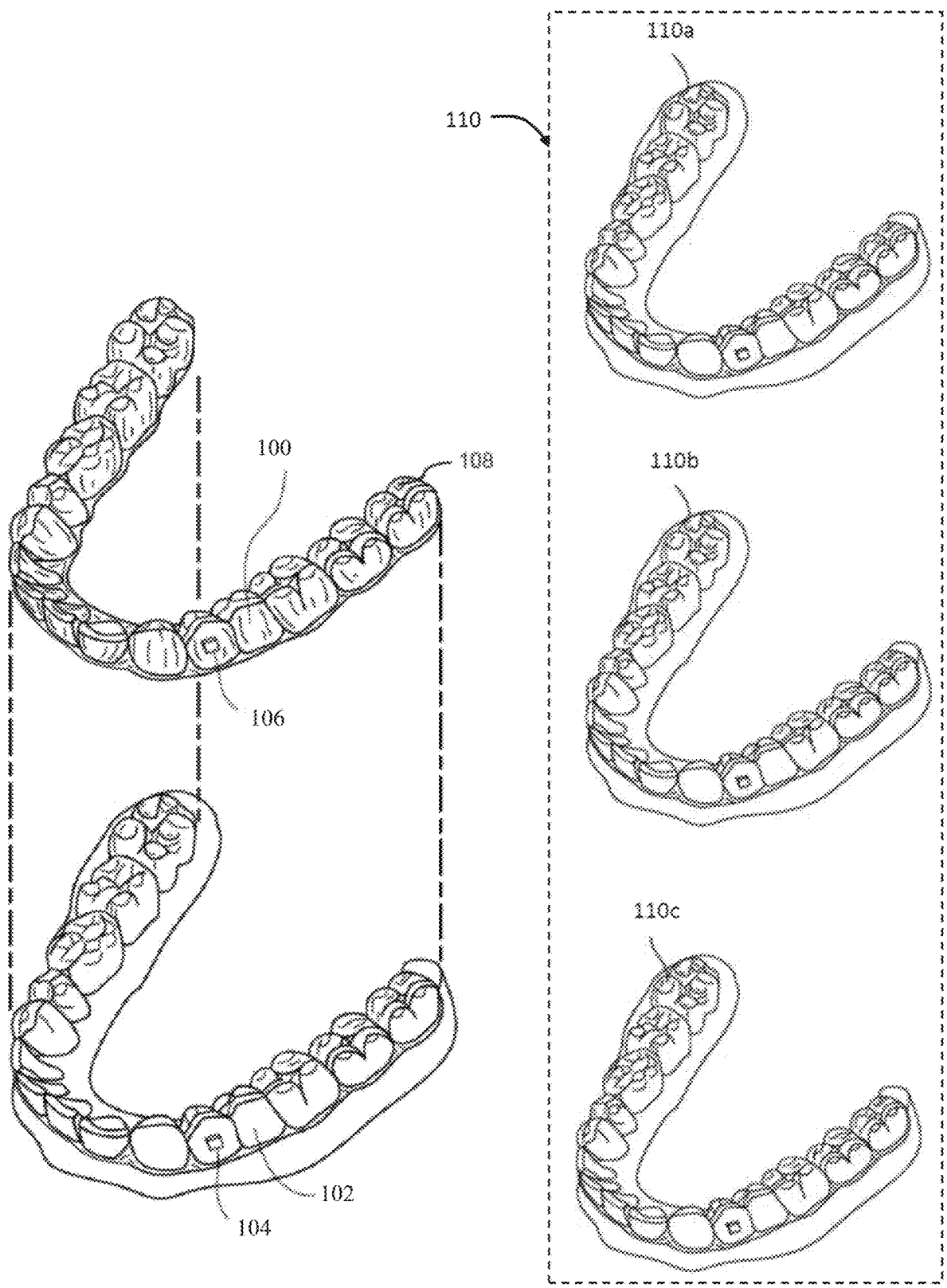
FIG. 1A illustrates a tooth repositioning appliance ("aligner" or "shell aligner")
FIG. 1B illustrates one example of a tooth repositioning system.

Orthodontic systems of the present disclosure can include tooth attachments and one or more orthodontic appliances that engage the attachments when worn by a patient. Appliances having teeth receiving cavities that receive and reposition teeth, e.g., via application of force due to appliance resiliency, are generally illustrated with regard to FIG. 1A. FIG. 1A illustrates an exemplary tooth repositioning appliance or aligner 100 that can be worn by a patient in order to achieve an incremental repositioning of individual teeth 102 in the jaw. The appliance can include a shell (e.g., a continuous polymeric shell or a segmented shell) having teeth-receiving cavities that receive and resiliently reposition the teeth. An appliance or portion(s) thereof may be indirectly fabricated using a physical model of teeth. For example, an appliance (e.g., polymeric appliance) can be formed using a physical model of teeth and a sheet of suitable layers of polymeric material. In some embodiments, a physical appliance is directly fabricated, e.g., using rapid prototyping fabrication techniques, from a digital model of an appliance. An appliance can fit over all teeth present in an upper or lower jaw, or less than all of the teeth. The appliance can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, some or most, and even all, of the teeth will be repositioned at some point during treatment. Teeth that are moved can also serve as a base or anchor for holding the appliance as it is worn by the patient. Typically, no wires or other means will be provided for holding an appliance in place over the teeth. In some cases, however, it may be desirable or necessary to provide individual attachments or other anchoring elements 104 on teeth 102 with corresponding receptacles or apertures 106 in the appliance 100 so that the appliance can apply a selected force on the tooth.

As described in detail herein, the appliance can include one or more modified occlusal surfaces 108. These modifications can include augmentation of desirable occlusal surfaces and/or reduction/removal of undesirable occlusal surfaces. For example, tooth facets can be augmented or reduced to alter occlusion between teeth of the upper and lower arches, thereby applying tooth moving forces based on the bite force supplied by the patient's jaws.

Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309, 215 and 6,830,450.

FIG. 1B illustrates a tooth repositioning system 110 including a plurality of appliances 110a, 110b, 110c. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. Each appliance may also have occlusal surfaces modified to apply tooth-moving forces based on the bite force of a patient. The patient's teeth can be progressively repositioned from an initial tooth arrangement to a target tooth arrangement by placing a series of incremental position adjustment appliances over the patient's teeth. For example, the tooth repositioning system 110 can include a first appliance 110a corresponding to an initial tooth arrangement, one or more intermediate appliances 110b corresponding to one or more intermediate arrangements, and a final appliance 110c corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

FIG. 1C illustrates a method 150 of orthodontic treatment using a plurality of appliances, in accordance with embodiments. The method 150 can be practiced using any of the appliances or appliance sets described herein. In step 160, a first orthodontic appliance is applied to a patient's teeth in order to reposition the teeth from a first tooth arrangement to a second tooth arrangement. In step 170, a second orthodontic appliance is applied to the patient's teeth in order to reposition the teeth from the second tooth arrangement to a third tooth arrangement. The method 150 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

The various embodiments of the orthodontic appliances presented herein can be fabricated in a wide variety of ways. As an example, some embodiments of the appliances herein (or portions thereof) can be produced using indirect fabrication techniques, such as by thermoforming over a positive or negative mold. Indirect fabrication of an orthodontic appliance can involve producing a positive or negative mold of the patient's dentition in a target arrangement (e.g., by rapid prototyping, milling, etc.) and thermoforming one or more sheets of material over the mold in order to generate an appliance shell.

Alternatively or in combination, some embodiments of the orthodontic appliances herein (or portions thereof) can be produced using direct fabrication, such as additive manufacturing or rapid prototyping techniques. For example, stereolithography can be used to fabricate one or more of the appliances herein. In some embodiments, stereolithography involves selective polymerization of a photosensitive resin (e.g., a photopolymer) according to a desired cross-sectional shape using light (e.g., ultraviolet light). The object geometry can be built up in a layer-by-layer fashion by sequentially polymerizing a plurality of object cross-sections. As another example, the appliances herein can be fabricated using selective laser sintering. In some embodiments, selective laser sintering involves using a laser beam to selectively melt and fuse a layer of powdered material according to a desired cross-sectional shape in order to build up the object geometry. As yet another example, the appliances herein can be fabricated by fused deposition modeling. In some embodiments, fused deposition modeling involves melting and selectively depositing a thin filament of thermoplastic polymer in a layer-by-layer manner in order to form an object. In yet another example, 3D printing can be used to fabricate the appliances herein. In some embodiments, 3D printing involves jetting or extruding one or more materials onto a build surface in order to form successive layers of the object geometry. U.S. Patent Pub. No. 2017/0007365 (incorporated herein by reference) discloses various direct fabrication methods useful for the fabrication of the appliances described herein.

In many embodiments, post-processing of appliances includes cleaning, post-curing, and/or support removal processes. Relevant post-processing parameters can include purity of cleaning agent, cleaning pressure and/or temperature, cleaning time, post-curing energy and/or time, and/or consistency of support removal process. These parameters can be measured and adjusted as part of a process control scheme. In addition, appliance physical properties can be varied by modifying the post-processing parameters. Adjusting post-processing machine parameters can provide another way to compensate for variability in material properties and/or machine properties.

The configuration of the orthodontic appliances herein can be determined according to a treatment plan for a patient, e.g., a treatment plan involving successive administration of a plurality of appliances for incrementally repositioning teeth. Computer-based treatment planning and/or appliance manufacturing methods can be used in order to facilitate the design and fabrication of appliances. For instance, one or more of the appliance components described herein can be digitally designed and fabricated with the aid of computer-controlled manufacturing devices (e.g., computer numerical control (CNC) milling, computer-controlled rapid prototyping such as 3D printing, etc.). The computer-based methods presented herein can improve the accuracy, flexibility, and convenience of appliance fabrication.

Orthodontic appliances, such as illustrated in FIG. 1A, impart forces to the crown of a tooth and/or an attachment positioned on the tooth at each point of contact between a tooth receiving cavity of the appliance and received tooth and/or attachment. The magnitude of each of these forces and their distribution on the surface of the tooth determines the type of orthodontic tooth movement which results. Types of tooth movements are conventionally delineated as extrusion, intrusion, rotation, tipping, translation and root movement. Tooth movement of the crown greater than the movement of the root is referred to as tipping. Equivalent movement of the crown and root is referred to as translation. Movement of the root greater than the crown is referred to as root movement. The appliances disclosed herein include structures that allow the adjustment of occlusive forces between surfaces (e.g., crowns) of teeth to better provide tooth-moving forces.

Tooth movements may be in any direction in any plane of space, and may comprise one or more of rotation or translation along one or more axes.

FIG. 2 illustrates a method 200 for designing an orthodontic appliance, in accordance with embodiments. The method 200 can be applied to any embodiment of the orthodontic appliances described herein. Some or all of the steps of the method 200 can be performed by any suitable data processing system or device, e.g., one or more processors configured with suitable instructions.

In step 210, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue. In any of these variations, a digital model of the patient's dentition, including all or some of the patient's teeth, including one or both of the upper and lower jaw. The digital model may be a literal model (e.g., models including relative surfaces and/or volumes), representative (from which actual surface may be derived within a desired level of precision) or some combination thereof.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. A target tooth arrangement engine may be used and may incorporate clinician input, prescription input and/or predefined (or adjustable) orthodontic principles to generate one or more final positions specific to the patient's teeth. The target tooth arrangement engine may be automated. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth. In some variations a system may include a movement path determination engine that may use the initial patient dentition/bite data (which may be held in an initial patient dentition/bite datastore accessible by the movement path determination engine) and the target tooth position from the target tooth arrangement engine, to determine one or more tooth movement paths. The movement path determination engine may use one or more rules (e.g., a ruleset) for clinically acceptable tooth movement, which may be stored in a data structure (e.g., a clinically acceptable tooth movement datastore) as well as the initial patient dentition/bite data and the target tooth (target dentition) arrangement data to generate one or more movement paths.

In step 220, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. The force system for achieving the calculated movement path(s) may be calculated, in some variations, using a force system estimator engine. Biomechanical principles, modeling techniques, force calculation/measurement techniques, and the like, including knowledge and approaches commonly used in orthodontia, may be used to determine the appropriate force system to be applied to the tooth to accomplish the tooth movement, and may be used as part of a force system estimator engine. In determining the force system to be applied, sources may be considered including literature, force systems determined by experimentation or virtual modeling, computer-based modeling, clinical experience, minimization of unwanted forces, etc.

In steps 230, 240, and 250, an appliance geometry for an orthodontic appliance configured to produce the force system is determined. The steps of determining an appliance geometry can include determining an occlusal geometry of the patient's upper and lower teeth, including identifying facets of the teeth that occlude to produce occlusal forces. This may be performed in a system by a bite occlusion estimator (for facet determination). The forces of occlusion may be the result of contact between the occlusal surfaces of teeth in the opposing arch and the force applied by the facial musculature when the jaws are closed (occluded). While an initial appliance geometry may include a surface that closely mimics the shape of the occlusal surfaces of the teeth (e.g., providing a thin layer of material more-or-less uniform in width across the teeth's occlusal surfaces), these surfaces can be modified to adjust the occlusion of the patient's teeth when wearing the appliance, thereby modifying the bite forces in a way that benefits the orthodontic treatment.

In step 230, upper and lower facets of teeth that are favorable and unfavorable for producing the force system are identified. For example, the bite occlusion estimator may identify the upper and lower facets of the teeth that are favorable and unfavorable for producing the force system. Since a default appliance shape can include an occlusal surface that mimics the natural occlusal surfaces of the patient's teeth, it is possible to identify favorable and unfavorable facets without needing to generate a default appliance geometry. Accordingly, in some embodiments, this identification may be made based on the geometry of the teeth without first generating an appliance geometry. Alternatively, a first appliance geometry can be generated, and the resulting facets can be analyzed based on this geometry. This process may involve iteratively performing step 250 in conjunction with steps 230 and 240, in order to generate an appliance geometry that provides specific, desirable occlusal forces. Favorable and unfavorable facets can be determined by using a measurement of the occlusal characteristics of the patient's teeth and jaws to model the occlusal forces of the patient. This model can include the effects of one or more appliances worn by the patient. The model can determine bite forces applied when the patient bites, and forces specific to different facets can be identified. In some cases, forces that are oriented along a desired direction of movement can be identified as favorable, and forces opposing the movement can be identified as unfavorable. Additionally, forces of multiple facets may be combined (e.g., as a vector sum), to identify combined forces that may be favorable and unfavorable. Furthermore, identifying the favorable and unfavorable forces can comprise identifying favorable and unfavorable moments, e.g., by determining a force direction, magnitude, and position to calculate a moment about a center of mass of a tooth. Determining favorable and unfavorable facets can thus involve determining those facets that provide forces and/or moments that help (or hinder) the tooth to move along a desired path of movement and/or rotation.

In step 240, modifications to the occlusal surface are determined. In some variations of a system performing these methods, the system may include an occlusal surface modification engine that may determine the modifications to be made to the occlusal surface consistent with the estimated bite occlusion and force system estimates. These modifications can remove unfavorable contacts and/or augment favorable contacts. For example, the modifications can include changes to the occlusal surface along tooth facets by modifying the thickness and/or shape of an appliance shell. These changes can be used to alter the occlusal forces applied to one or more teeth of the patient, thereby increasing favorable tooth-moving forces (and/or moments) along a desired trajectory while decreasing unfavorable tooth-moving forces (and/or moments), such as those opposing a desired trajectory or otherwise deviating from the trajectory.

In step 250, a new appliance geometry is generated based on modifications in steps 230 and 240. An aligner fabrication engine may be used as part of a system in order to generate the one or more appliance(s). The new appliance geometry can include modifications to the occlusal surfaces such as augmentations of favorable facets and diminutions of unfavorable facets. The new appliance geometry can also include modified positions of tooth-moving cavities; for example, non-occlusal tooth-moving forces can be modified to account for the changed occlusal forces, so as to generate an overall force to urge teeth along a desired path of movement. Steps 230, 240, and 250 can be iterated multiple times when designing an appliance to adjust the overall force configuration of the appliance. Furthermore, as discussed above, step 250 can be performed before steps 230 and 240 to generate an initial appliance geometry (e.g., one that applies non-occlusal tooth-moving forces but lacks occlusal force optimization) that can be iteratively adjusted by modifying the occlusal surfaces as described herein to provide more favorable tooth-moving forces.

The appliance geometry may comprise one or more tooth engagement structures, and the tooth engagement structures may be configured to engage the surface of at least one tooth. In addition to the occlusal surfaces, further tooth surface(s) may be chosen for engagement, such as an interproximal surface, a buccal or lingual surface, or any other surface of the tooth, depending on the characteristics of the force on the tooth it is to elicit. The geometry may also comprise a specification of material as a function of location within the orthodontic appliance.

Determination of the appliance geometry, material composition, and/or properties can be performed using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the AutoCAD® software products available from Autodesk, Inc., of San Rafael, CA. For creating finite element models and analyzing them, program products from a number of vendors can be used, including finite element analysis packages from ANSYS, Inc., of Canonsburg, PA, and SIMULIA(Abaqus) software products from Dassault Systèmes of Waltham, MA.

Optionally, one or more appliance geometries can be selected for testing or force modeling. As noted above, a desired tooth movement, as well as a force system required or desired for eliciting the desired tooth movement, can be identified. Using the simulation environment, a candidate appliance geometry can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

In step 260, instructions for fabrication of the orthodontic appliance having the appliance geometry are generated. The instructions can be configured to control a fabrication system or device in order to produce the orthodontic appliance with the specified appliance geometry. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.), in accordance with the various methods presented herein. The instructions can alternatively be configured for indirect fabrication of the appliance, e.g., by thermoforming. A mixture of thermoforming and direct fabrication techniques may also be used as needed.

Although the above steps show a method 200 of designing an orthodontic appliance in accordance with some embodiments, a person of ordinary skill in the art will recognize some variations based on the teaching described herein. Some of the steps may comprise sub-steps. Some of the steps may be repeated as often as desired. One or more steps of the method 200 may be performed with any suitable fabrication system or device, such as the embodiments described herein. Some of the steps may be optional, and the order of the steps can be varied as desired.

Any of the methods described herein may be embodied as a system for performing the method. For example, a system for use in orthodontic treatment may include one or more processor and a memory coupled to the one or more processors. The memory may be configured to store computer-program instructions, that, when executed by the one or more processors, perform a computer-implemented method comprising: obtaining a representation of a patient's dentition, said representation including bite information for a plurality of the patient's teeth; determining a movement path to move one or more teeth from an initial arrangement to a target arrangement; determining a first facet on a first tooth of a first arch and a second facet on a second tooth of a second arch, wherein said bite information indicates that said first tooth and second tooth come into occlusion when the patient bites; and determining an appliance geometry for an orthodontic appliance configured to move the one or more teeth along the movement path, wherein the appliance geometry includes a first shell including a first tooth-receiving cavity to receive the first tooth, said first tooth-receiving cavity comprising an occlusal surface feature at a location corresponding to the first facet of the first tooth and protruding away from the first tooth-receiving cavity.

Figure 10:
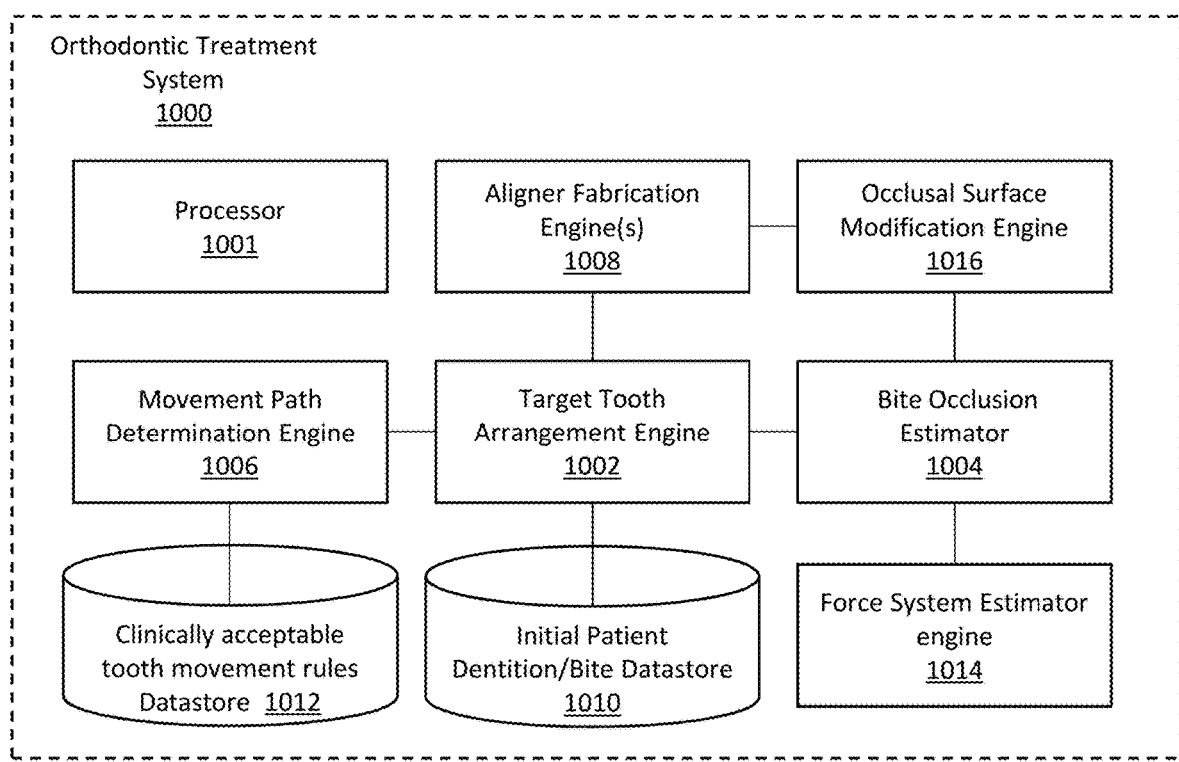
FIG. 10 illustrate a schematic of one example of a system for designing an orthodontic appliance as described herein.

The system may include one or more engines and/or data structures adapted to perform these methods. For example, FIG. 10 is a diagram showing an example of an orthodontic treatment system 1000. The modules of the orthodontic treatment system 1000 may include one or more engines and datastores. A computer system can be implemented as an engine, as part of an engine or through multiple engines. As used herein, an engine includes one or more processors 1001 or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the figures herein.

The engines described herein, or the engines through which the systems and devices described herein can be implemented, can be cloud-based engines. As used herein, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used herein, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described herein.

Datastores can include data structures. As used herein, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described herein, can be cloud-based datastores. A cloud-based datastore is a datastore that is compatible with cloud-based computing systems and engines.

The Orthodontic Treatment System 1000 may include a computer-readable medium, a target tooth arrangement engine 1002, a movement path determination engine 1006, a bit occlusion estimator 1004, a force system estimator engine 1014, an occlusal surface modification engine 1016, an aligner fabrication engine 1008, a clinically acceptable tooth movement rules datastore 1012 and an initial patient dentition/bite datastore 1010. One or more of the modules of the system 1000 may be coupled to one another (e.g., through the example couplings shown in FIG. 1) or to modules not explicitly shown in FIG. 10. The computer-readable medium may include any computer-readable medium, including without limitation a bus, a wired network, a wireless network, or some combination thereof.

The movement path determination engine 1006 may determine a movement path to move one or more teeth from an initial arrangement to a target arrangement. The movement path determination engine may use both the target tooth arrangement (determined by the target tooth arrangement engine 1002) and the information/data from the initial patient dentition/bite data store 1010. As mentioned, the initial arrangement data in the datastore 1010 can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. The datastore may store a digital data set that represents the initial (e.g., pretreatment) arrangement of the patient's teeth and other tissues. Optionally, the initial digital data set may be processed to segment the tissue constituents from each other. For example, data structures that digitally represent individual tooth crowns can be included. Digital models of entire teeth can be produced, including measured or extrapolated hidden surfaces and root structures, as well as surrounding bone and soft tissue; the digital model may include all or some of the patient's teeth, including one or both of the upper and lower jaw.

The target tooth arrangement engine 1002 may determine a desired target arrangement of the teeth (e.g., a desired and intended end result of orthodontic treatment) using the digital model of the patient's teeth (e.g., from the initial patient dentition/bite datastore) and may determine the final target tooth arrangement based on one the application of clinically acceptable tooth movement rules (e.g., from the datastore 1012) in reference to one or more of: a of a prescription, and/or direct physician/technician input. The target tooth arrangement engine 1002 may therefore incorporate clinician input, prescription input and/or predefined (or adjustable) orthodontic principles to generate one or more final positions specific to the patient's teeth. The target tooth arrangement engine (and indeed, any of these modules) may be automated. The target tooth arrangement engine may therefore generate one or more desired final positions of the teeth from a digital representation of the teeth, and the final position and surface geometry of each tooth can be specified to form a complete model of the tooth arrangement at the desired end of treatment.

The movement path determining engine 1006 may then use the initial position and a target position for each tooth, to define a motion of each tooth. In some embodiments, the movement paths are configured to move the teeth in the quickest fashion with the least amount of round-tripping to bring the teeth from their initial positions to their desired target positions. As mentioned, the tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth. The movement path determination engine 1006 may use the initial patient dentition/bite data (which may be held in an initial patient dentition/bite datastore 1010 accessible by the movement path determination engine 1006) and the target tooth position from the target tooth arrangement engine 1002, to determine one or more tooth movement paths. The movement path determination engine 1006 may use one or more rules (e.g., a ruleset) for clinically acceptable tooth movement, as stored in a clinically acceptable tooth movement datastore 1012, as well as the initial patient dentition/ bite data and the target tooth (target dentition) arrangement data to generate one or more movement paths.

A force system estimator engine 1014 may estimate movement of the one or more teeth along the movement path is determined by the movement path determination engine 1006. The force system estimator engine may determine the force system(s) for achieving the calculated movement path(s), e.g., using a force system estimator engine. The force system estimator engine may apply biomechanical principles, modeling techniques, force calculation/measurement techniques, and the like, including knowledge and approaches commonly used in orthodontia, to determine the appropriate force system to be applied to the tooth to accomplish the tooth movement for the movement path(s) from the movement path determination engine. The force system estimator engine 1014 may include computer-based modeling, minimization of unwanted forces, etc.

The system may also include a bite occlusion estimator 1004 to determine (in conjunction with, or part of, the force system estimator engine 1014) an occlusal geometry of the patient's upper and lower teeth, including identifying facets of the teeth that occlude to produce occlusal forces. For example, the bite occlusion estimator 1004 may determine upper and lower facets of teeth that are favorable and unfavorable for producing the force system identified. In some embodiments, this identification may be made based on the geometry of the teeth without first generating an appliance geometry. Alternatively, a first appliance geometry can be generated, and the resulting facets can be analyzed based on this geometry. This system may iteratively generating an appliance geometry that provides specific, desirable occlusal forces. Favorable and unfavorable facets can be determined by using a measurement of the occlusal characteristics of the patient's teeth and jaws to model the occlusal forces of the patient. This model can include the effects of one or more appliances worn by the patient.

The occlusal surface modification engine 1016 may determine modifications to the occlusal surface. The occlusal surface modification engine may determine the modifications to be made to the occlusal surface consistent with the estimated bite occlusion and force system estimates. These modifications can remove unfavorable contacts and/or augment favorable contacts. For example, the modifications can include changes to the occlusal surface along tooth facets by modifying the thickness and/or shape of an appliance shell. These changes can be used to alter the occlusal forces applied to one or more teeth of the patient, thereby increasing favorable tooth-moving forces (and/or moments) along a desired trajectory while decreasing unfavorable tooth-moving forces (and/or moments), such as those opposing a desired trajectory or otherwise deviating from the trajectory.

An aligner fabrication engine 1008 may then be used to generate a new appliance geometry based on modifications from the occlusal surface modification engine 1016. The aligner fabrication engine 1008 may generate the one or more appliance(s). The new appliance geometry can include modifications to the occlusal surfaces such as augmentations of favorable facets and diminutions of unfavorable facets. The new appliance geometry can also include modified positions of tooth-moving cavities; for example, non-occlusal tooth-moving forces can be modified to account for the changed occlusal forces, so as to generate an overall force to urge teeth along a desired path of movement.

Figure 3:
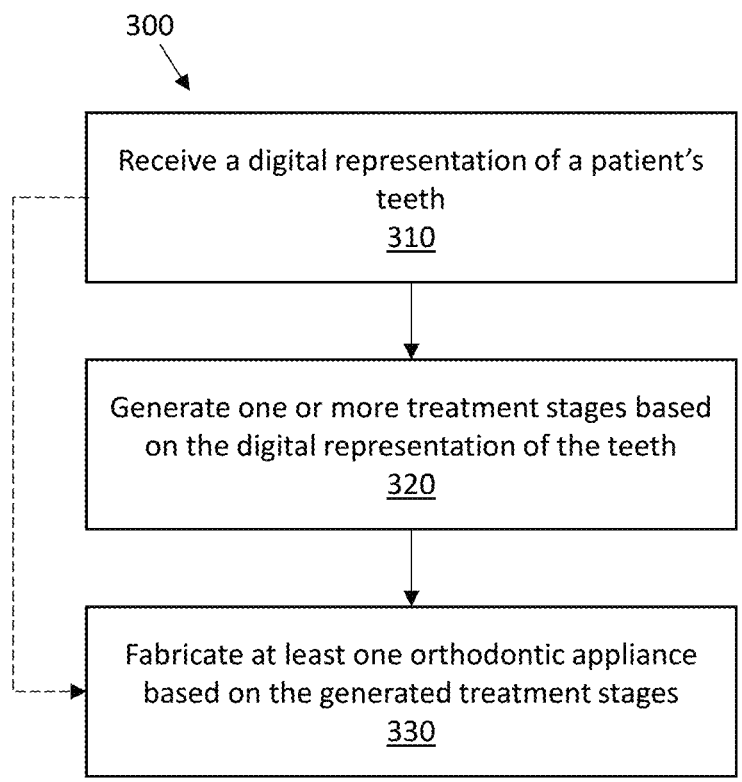
FIG. 3 illustrates one example of a method for digitally planning an orthodontic treatment.

FIG. 3 illustrates a method 300 for digitally planning an orthodontic treatment and/or design or fabrication of an appliance, in accordance with embodiments. The method 300 can be applied to any of the treatment procedures described herein and can be performed by any suitable data processing system.

In step 310, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In step 320, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In step 330, at least one orthodontic appliance is fabricated based on the generated treatment stages. For example, a set of appliances can be fabricated, each shaped according a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired.

In some instances, staging of various arrangements or treatment stages may not be necessary for design and/or fabrication of an appliance. As illustrated by the dashed line in FIG. 3, design and/or fabrication of an orthodontic appliance, and perhaps a particular orthodontic treatment, may include use of a representation of the patient's teeth (e.g., receive a digital representation of the patient's teeth 310), followed by design and/or fabrication of an orthodontic appliance based on a representation of the patient's teeth in the arrangement represented by the received representation.

Figure 4:
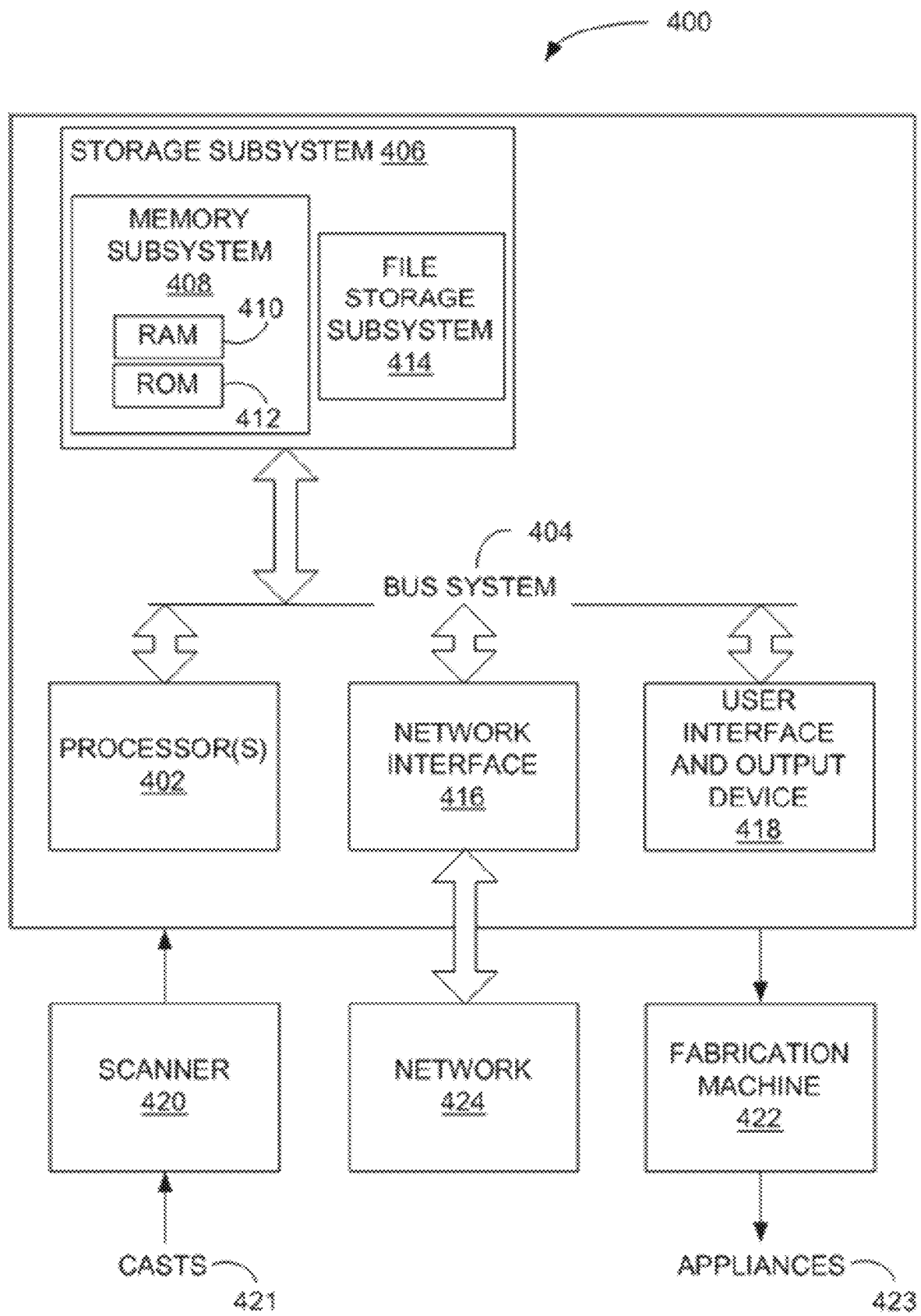
FIG. 4 is a simplified block diagram of an example of a data processing system.

FIG. 4 is a simplified block diagram of a data processing system 400 that may be used in executing methods and processes described herein. The data processing system 400 typically includes at least one processor 402 that communicates with one or more peripheral devices via bus subsystem 404. These peripheral devices typically include a storage subsystem 406 (memory subsystem 408 and file storage subsystem 414), a set of user interface input and output devices 418, and an interface to outside networks 416. This interface is shown schematically as "Network Interface" block 416, and is coupled to corresponding interface devices in other data processing systems via communication network interface 424. Data processing system 400 can include, for example, one or more computers, such as a personal computer, workstation, mainframe, laptop, and the like.

The user interface input devices 418 are not limited to any particular device, and can typically include, for example, a keyboard, pointing device, mouse, scanner, interactive displays, touchpad, joysticks, etc. Similarly, various user interface output devices can be employed in a system of the invention, and can include, for example, one or more of a printer, display (e.g., visual, non-visual) system/subsystem, controller, projection device, audio output, and the like.

Storage subsystem 406 maintains the basic required programming, including computer readable media having instructions (e.g., operating instructions, etc.), and data constructs. The program modules discussed herein are typically stored in storage subsystem 406. Storage subsystem 406 typically includes memory subsystem 408 and file storage subsystem 414. Memory subsystem 408 typically includes a number of memories (e.g., RAM 410, ROM 412, etc.) including computer readable memory for storage of fixed instructions, instructions and data during program execution, basic input/output system, etc. File storage subsystem 414 provides persistent (non-volatile) storage for program and data files, and can include one or more removable or fixed drives or media, hard disk, floppy disk, CD-ROM, DVD, optical drives, and the like. One or more of the storage systems, drives, etc. may be located at a remote location, such coupled via a server on a network or via the internet/World Wide Web. In this context, the term "bus subsystem" is used generically so as to include any mechanism for letting the various components and subsystems communicate with each other as intended and can include a variety of suitable components/systems that would be known or recognized as suitable for use therein. It will be recognized that various components of the system can be, but need not necessarily be at the same physical location, but could be connected via various local-area or wide-area network media, transmission systems, etc.

Scanner 420 includes any means for obtaining a digital representation (e.g., images, surface topography data, etc.) of a patient's teeth (e.g., by scanning physical models of the teeth such as casts 421, by scanning impressions taken of the teeth, or by directly scanning the intraoral cavity), which can be obtained either from the patient or from treating professional, such as an orthodontist, and includes means of providing the digital representation to data processing system 400 for further processing. Scanner 420 may be located at a location remote with respect to other components of the system and can communicate image data and/or information to data processing system 400, for example, via a network interface 424. Fabrication system 422 fabricates appliances 423 based on a treatment plan, including data set information received from data processing system 400. Fabrication machine 422 can, for example, be located at a remote location and receive data set information from data processing system 400 via network interface 424.

The data processing aspects of the methods described herein can be implemented in digital electronic circuitry, or in computer hardware, firmware, software, or suitable combinations thereof. Data processing apparatus can be implemented in a computer program product tangibly embodied in a machine-readable storage device for execution by a programmable processor. Data processing steps can be performed by a programmable processor executing program instructions to perform functions by operating on input data and generating output. The data processing aspects can be implemented in one or more computer programs that are executable on a programmable system, the system including one or more programmable processors operably coupled to a data storage system. Generally, a processor will receive instructions and data from a read-only memory and/or a random access memory. Storage devices suitable for tangibly embodying computer program instructions and data include all forms of nonvolatile memory, such as: semiconductor memory devices, such as EPROM, EEPROM, and flash memory devices; magnetic disks such as internal hard disks and removable disks; magneto-optical disks; and CD-ROM disks.

Figure 5A:
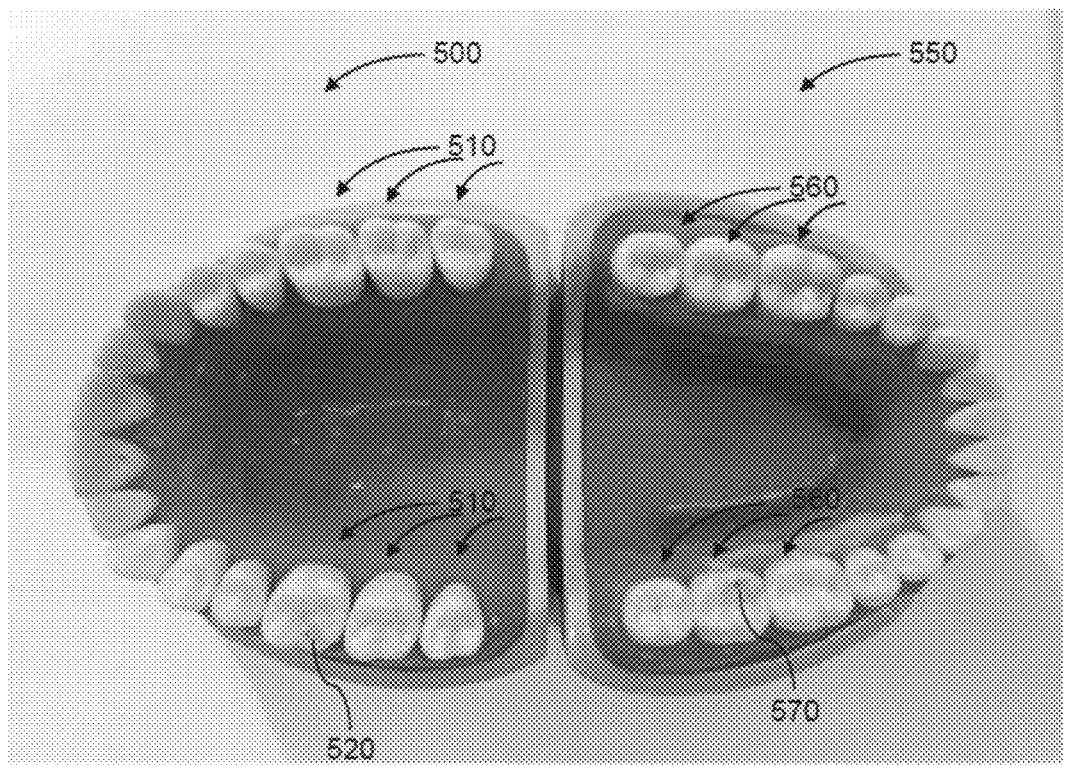
FIG. 5A illustrates the upper and lower arches of a patient, and exemplary location of occluding facets of teeth on the arches which can be adjusted to provide a tooth-moving force.

FIG. 5A illustrates the upper arch 500 and lower arch 550 of a patient. As can be seen in the illustration, the upper posterior teeth 510 and lower posterior teeth 560 of the patient comprise occlusal surfaces, including facets that interlock when the patient bites. Occlusal forces are distributed among the facets of the occlusal surface when the patient bites, collectively producing bite forces on each tooth. Ordinarily, these forces are uncontrolled, and provide essentially random forces to the upper and lower teeth. However, by selectively modifying the occlusal surfaces with an appropriate orthodontic appliance, the bite forces between the facets of specific teeth can be modified, resulting in a controlled bite force that can provide strong tooth-moving forces and moments in specific directions, urging the teeth along a desired path.

For example, FIG. 5A shows a pair of occluding facets 520 and 570 on opposite teeth of the upper and lower arches. The occluding facets 520 and 570 can be augmented, increasing the height of the appliance at each facet relative to the remaining facets of the tooth. When the patient bites down, this augmentation causes the two augmented facets 520 and 570 to come into contact before the remaining facets, thereby providing an enhanced occlusion force localized to the two augmented facets. This can produce a force and moment on each facet substantially perpendicular to the surface of the augmented appliance surface for that facet; for example, facet 520 can receive a force in a distal/buccal direction while facet 570 receives an opposite force in a mesial/lingual direction.

In some embodiments, distalization of maxillary molars can be accomplished by appropriately altering the facets of opposing teeth. Distalization can be useful to correct an Angle Class II molar relationship, for example. This can be accomplished by fabricating a feature in the aligner which produces contact between mesial lingual cusp 570 of the lower first molar and the distal buccal cusp 520 of the upper first molar. When the patient bites, the masseter muscle closes the jaws, and the bite forces are redirected to act between the two cusps 520 and 570. A distal force is applied to the upper molar to improve distalization of the tooth during treatment. In the lower arch, bite force is redirected (from essentially vertical) and the mesial component of the force tends to position the lower dentition forward. In this way, the contact between a facet of the tooth in the upper arch and a facet of the opposing tooth in the lower arch is enhanced by the feature placed in the aligner. The bite force is thus used to help accomplish tooth movements desirable for orthodontic treatment.

Alternatively, facets 520 and 570 can have their surfaces modified to reduce occlusion force if such forces are undesirable. For example, by fabricating appliances with the surface heights of facets 520 and 570 reduced relative to other facets' heights, bite force can be redirected away from facets 520 and 570. Alternatively, as illustrated below in FIG. 6B, a "bubble" can be formed between the inner surface of the appliance and the corresponding facet, allowing force to be directed away from the facets and redistributed to other parts of the appliance shell, thereby reducing occlusion forces at facets 520 and 570. Furthermore, by controlling the occlusion forces at each of a plurality of facets on upper and lower teeth, the occlusion forces of multiple teeth can be controlled simultaneously (or sequentially) to provide tooth moving forces, allowing orthodontic repositioning patient's teeth.

Figure 5B:
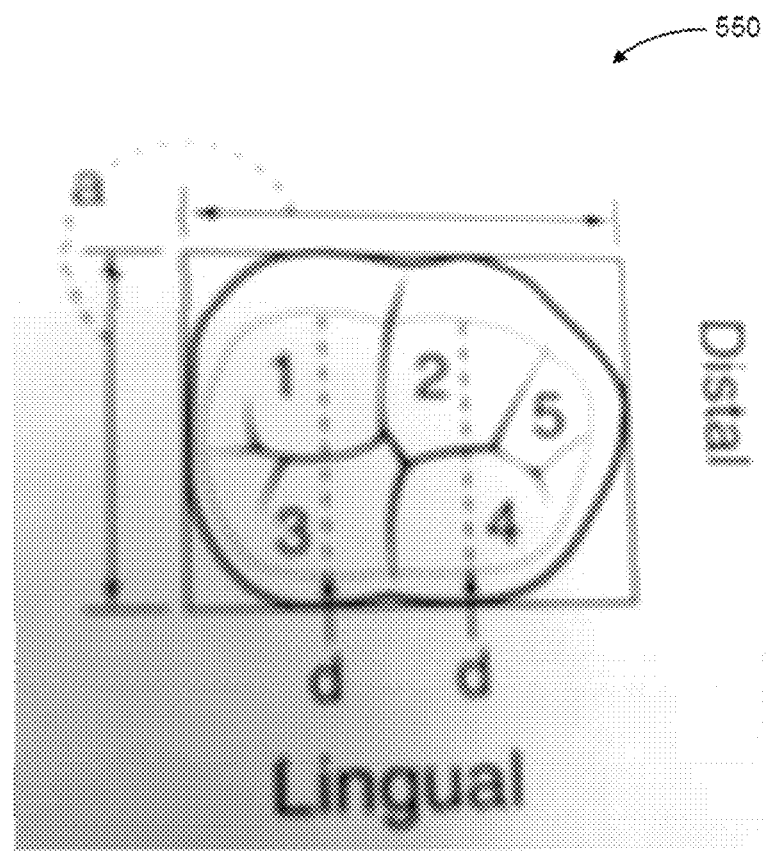
FIG. 5B illustrates one example of facets of a molar, which can have their occlusal surfaces altered by an appliance covering the occlusal surface in order to adjust occlusal forces.

FIG. 5B illustrates the facets of a molar 550, which can have their occlusal surfaces altered by an appliance covering the occlusal surface in order to adjust occlusal forces. The occlusal surface of a molar includes of several facets; for example, the molar 550 has 5 illustrated facets labeled 1, 2, 3, 4, and 5. Facets 3 and 4 are located on the lingual side of the molar, with facet 3 located mesial of facet 4. Facets 1 and 2 are located on the buccal side of the molar, with facet 1 located mesial of facet 2. A facet can also be located in a central location on one of the buccolingual and mesiodistal axes; for example, facet 5 is located near the center of the buccolingual axis, but on the distal part of molar 550. While these facets are provided In some embodiments, teeth that are tipped lingually (lingualversion) can be corrected using an augmentation contact feature that is fabricated between the buccal facing facades of the occlusal surface in one arch and the lingual occlusal facades of one arch to the buccal facing facades of the opposing arch. The resulting modified occlusion surface redirects the bite force, resulting in a component of the force aiding to upright the tooth.

FIGS. 6A-6D illustrate appliances with occlusal surface modifications to augment contact forces between favorable facets while removing or reducing contact forces between unfavorable facets of opposing teeth. These figures illustrate a configuration of occlusal contacts that exploits bite forces in a manner that can be useful in correcting teeth exhibiting a crossbite, for example.

Figure 6A:
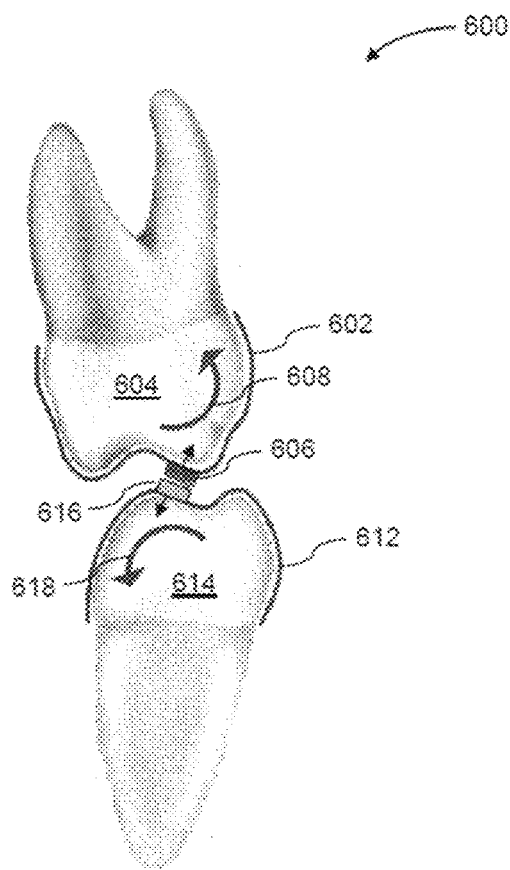
FIGS. 6A-6D illustrate examples of appliances with occlusal surface modifications to augment contact forces between favorable facets while removing or reducing contact forces between unfavorable facets of opposing teeth.

FIG. 6A shows an appliance system 600 comprising an orthodontic shell appliance 602 on an upper tooth 604. The shell appliance 602 comprises an occlusal contact feature 606, illustrated here as a rectangular solid. The occlusal contact feature 606 is designed to contact an occlusal contact feature 616 located on an orthodontic shell appliance 612 on a tooth 614 of the opposing arch. The occlusal contact features 606 and 616 are positioned to load specific facets of the teeth. The when the patient bites, the contact between the occlusal contact features produce equal and opposite bite forces acting on the opposing teeth, illustrated by small arrows pointing from each occlusal contact feature into the respective tooth. Furthermore, the forces can apply a moment to each tooth, illustrated by curved arrows 608 and 618.

Figure 6B:
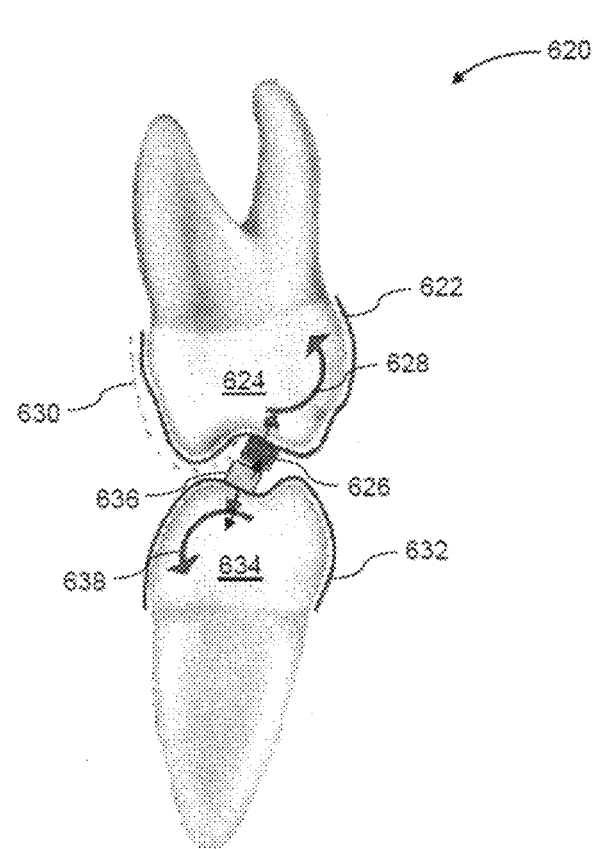

FIG. 6B illustrates an appliance system 620 comprising an orthodontic appliance 622 similar to that illustrated in FIG. 6A, but with an occlusal bubble 630 added to reduce undesirable loading on certain facets. The shell appliance 622 comprises an occlusal contact feature 626, configured to contact an occlusal contact feature 636 located on an appliance 632 on the opposing tooth. When the patient bites, a pair of equal and opposite contact forces are applied to teeth 624 and 634, illustrated by small arrows pointing from each occlusal contact feature into the respective tooth. The contact forces can also apply a moment to each tooth, illustrated by curved arrows 628 and 638. In order to reduce undesirable contact forces between other tooth facets, an occlusal bubble 630 is added to appliance 622, illustrated by a dotted line. The surface of the appliance 622 is adjusted to fall on the dotted line, such that there is a space between the appliance 622 and the tooth 624. This reduces the bite forces applied to the facets over which the bubble extends, allowing force to be concentrated on other facets to better direct the bite force in a desired direction. When the appliance is worn, bite forces applied along the surface of the bubble 630 by the opposing tooth may result in a deflection of the bubble toward the tooth 634, allowing such forces to be distributed along the surface of the tooth instead of concentrated at an undesirable contact location.

Figure 6C:
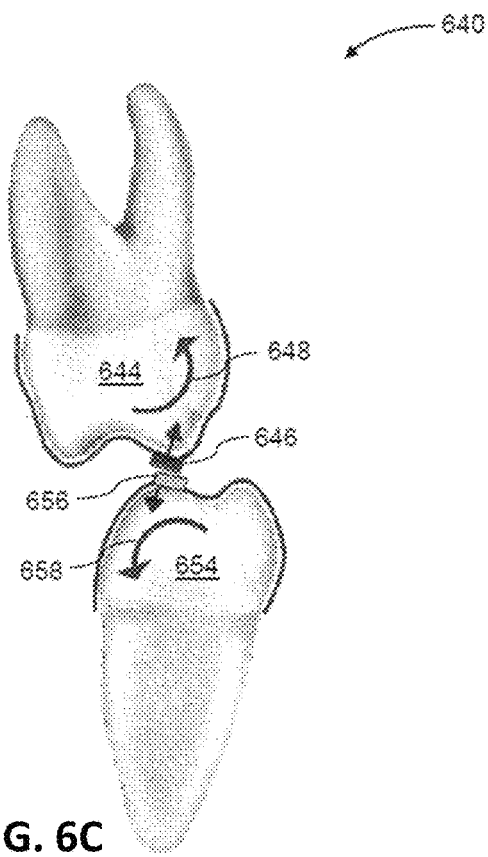
Figure 6D:
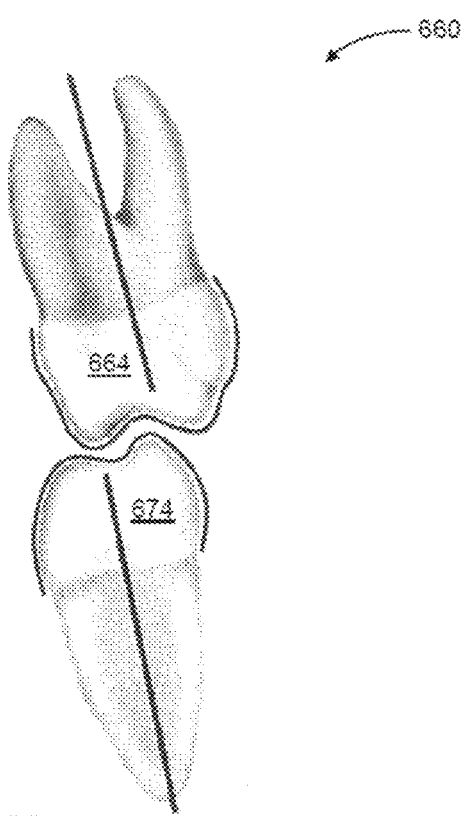

FIG. 6C shows how an appliance with occlusal surface features such as those shown in FIGS. 6A and 6B can be used to correct teeth in a crossbite configuration 640. As illustrated, teeth 644 and 654 exhibit a crossbite, such that the facets of the teeth fail to properly fit together when the patient bites. This malocclusion can be corrected by applying forces to each tooth using occlusal surface features 646 and 656. The contact forces generated by the occlusal surface features produce moments 648 and 658 that can tip the teeth into a more desirable orientation. The contact forces themselves can also be used directly to translate the teeth along a tooth movement path; for example, each contact force can be represented as a pair of force components—one in a vertical and one in a horizontal direction. The vertical forces may be used to intrude the teeth, or may produce no movement (e.g., if the force is small enough to neglect, or is countered by extrusion forces applied elsewhere by the appliance), while the horizontal forces may move the teeth along a desired path. As the teeth move, it may be desirable to include occlusal bubbles (such as those as illustrated in FIG. 6D) during at least some steps of treatment to relieve occlusion forces on specific facets. This can prevent unwanted contacts from resisting the desired movement of the teeth, for example.

FIG. 6D illustrates a dental configuration 660 which can be the result of treatment with appliances incorporating the features illustrated in FIGS. 6A-C. The teeth 664 and 674 have been moved to an alignment approximating an orthodontically ideal occlusion, and further appliances can provide additional orthodontic treatment without requiring occlusal surface features.

It will be understood by those skilled in the art that although illustrated as rectangular in shape, the occlusal surface features described herein can be varied in shape. For example, a contact feature can be more smoothly contoured to more closely resemble a natural tooth cusp. Additionally, the upper and lower contact features can differ in shape; for example, an upper feature may be substantially curved while the corresponding lower is substantially flat near the point of contact, or vice versa. The shape of the contact features can be modified as needed for the comfort of the patient, for example, while substantially maintaining the point of contact and direction of force between the upper and lower teeth.

Furthermore, although the occlusal contacts illustrated in FIGS. 6A-C show contact between an upper and lower occlusal surface feature, contact can also be made between one occlusal surface feature and the opposing tooth, or an opposing appliance surface without an occlusal surface feature. Thus, tooth-moving forces can be applied to teeth of an arch on which no appliance is worn, in addition to opposing forces on the arch on which an appliance is worn. Moreover, multiple surface features can be placed on a given tooth's facets to further customize the magnitude, location, and direction of bite forces, and multiple teeth in either or both arches can have their occlusion modified with these features, producing orthodontic correction to multiple teeth simultaneously, as well as sequentially, as desired. In addition to varying the number and locations of the occlusal surface features, the number and locations of occlusal bubbles may also be varied. For example, a plurality of bubbles can be placed over a plurality of facets on a tooth to reduce occlusal forces for each. In some cases, bubbles can be used on each of two opposing teeth to reduce unwanted forces on each. Furthermore, in some cases, occlusal bubbles can be employed without occlusal surface features; for example, when a patient's natural occlusion would produce desirable forces in the absence of force on particular facets, bubbles may be employed in conjunction with an ordinary, close-fitting appliance surface to produce a net force and/or moment on a tooth to move it along a desired trajectory.

Figure 7A:
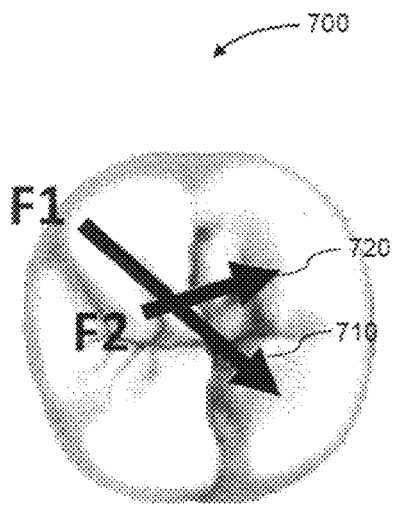
FIGS. 7A and 7B illustrate how multiple favorable facet contacts can be used in conjunction to produce a net tooth-moving force.
Figure 7B:
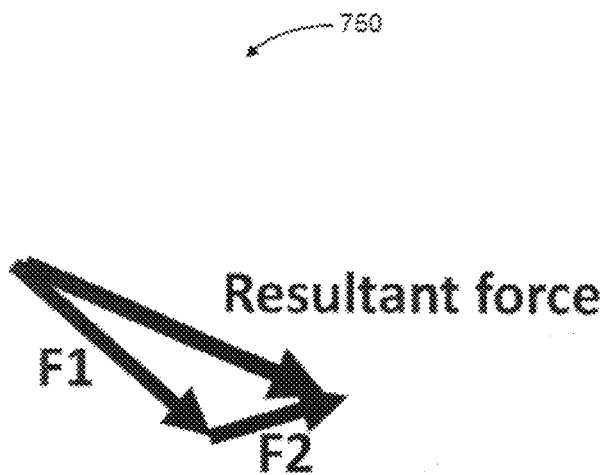

FIGS. 7A and 7B illustrate how multiple favorable facet contacts can be used in conjunction to produce a net tooth-moving force, in accordance with embodiments. FIG. 7A illustrates a tooth 700 with a plurality of facets 710 and 720. An appliance may be used to apply bite forces selectively on facets 710 and 720. For example, an appliance can be worn on an opposing tooth (not shown) that includes surface features to contact facets 710 and 720. An appliance can also be worn on tooth 700, which can optionally have occlusal surface features on facets 710 and 720 to apply reaction forces through contact with an opposing tooth. The resulting forces on facets 710 and 720 are illustrated as F1 and F2, respectively. The forces can be represented as a 3-dimensional vector, and can be produced in a direction orthogonal to the surface at their respective points of contact. The magnitude of the forces can be adjusted by changing the size and position of the occlusal features, as well as by adjusting their material properties such as elasticity.

The two forces can be used to produce a net force on tooth 700 to urge it along a desired path from an initial position to a final position. FIG. 7B illustrates the direction of the resulting force on the tooth, which can be calculated as a vector sum of forces F1 and F2. The tooth may be moved from an initial to a final position over the course of multiple stages, which can include multiple appliances with different occlusal surface features (including omitting or adding features as needed, as well as modifying the shape and location of occlusal surface features and/or bubble features as needed to produce desired tooth movements). Furthermore, the final position of a first tooth movement path can be used as an initial position for a second movement path, allowing a tooth to be moved over a chain of trajectories to accomplish complex orthodontic movement (such as round-tripping, for example)

It will be understood by those skilled in the art that determining the amount of tooth-moving force produced by the occlusal surface modifications provided herein can involve determining the bite force experienced by each of one or more teeth when wearing the appliance(s). In contrast to ordinary orthodontic appliances, which provide a small but continuous force over a long span of time when worn, the bite forces applied by the appliances disclosed herein are large and intermittent. Accordingly, an effective average bite force can be computed by taking into account the bite force applied to each of the patient's teeth when biting (e.g., based on the force applied by the masseter muscle), as well as the relative amounts of time that the patient spends biting versus not biting. This calculation can take into account the periods of time during which the patient wears the appliance(s) (e.g., how many hours per day) as well as the expected bite characteristics for a patient during the time that the appliance(s) are worn. For example, the calculation can take into account whether the patient wears the appliance(s) when eating (when mastication can produce stronger, more frequent bite forces), as well as what the times of day in which the appliance(s) are worn (e.g., different average bite forces may be estimated for appliances worn during hours of the day versus when sleeping at night, based on expected or measured average bite forces during these times). Accounting for bite forces in this manner can produce more accurate force estimates, thereby allowing tooth movement to be more accurately controlled.

In some embodiments, the occlusal surface features can be produced as a feature that extends from the facet of an appliance. The occlusal surface features can be hollow (e.g., shaped as a pinched or folded portion of surface that protrudes away from the tooth, leaving a small gap between the center of the protrusion and the tooth surface), allowing straightforward production using thermoforming techniques. The occlusal surface features can also be solid. Such features can readily be produced using direct fabrication techniques, or by affixing additional material to the surface of a thermoformed appliance, for example. The occlusal bubbles described herein can be manufactured as a hollow cavity with a thin wall. In some cases, the cavity can be instead be filled with elastic material, which may be used to more precisely adjust the amount and distribution of force applied by occlusal contacts with the bubble.

As described herein an apparatus (e.g., device or system, including an orthodontic or dental apparatus, such as a dental aligner) may be configured to selectively intercuspate when worn. In some variations selective intercuspation, as described above in FIGS. 5A-7B, may provide an additional, selective, force, such as a bite force, when the patient is wearing the device and intercuspates, that may assist in moving one or more teeth in a desired way, for example to achieve a treatment plan for orthodontically aligning the patient's teeth.

Figure 8A:
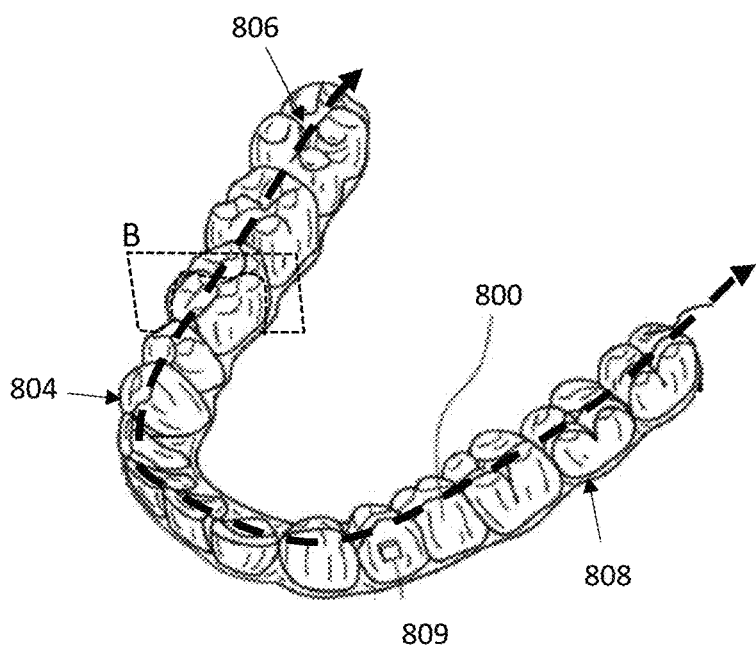
FIG. 8A is an example of an aligner device including an occlusal outer surface contour that is not aligned with the occlusal inner surface contour. A section, including sections transverse to a line in the occlusal plane (dashed line) transverse B are indicated.

Thus, any of the apparatuses described herein may include one or more dental aligner devices that are each configured as shell aligners having a shell body in which the inner occlusal surface (that substantially matches the patient's teeth occlusal surface) is not aligned with the outer occlusal surface of the shell aligner. FIG. 8A shows one example of a shell aligner having a different occlusal surfaces. In FIG. 8A, the dental aligner device 800 to be worn on a patient's teeth includes a shell body 804 having a lingual side, an occlusal side 806, and a buccal side, wherein the shell body comprises an inner tooth-receiving region 818 configured to fit over the patient's teeth and to apply a force to move one or more of the patient's teeth to a predetermined configuration when the shell body is worn on the patient's teeth. The aligner may include attachment engagement regions 809 for engaging with an attachment bonded to the patient's teeth.

Figure 8B:
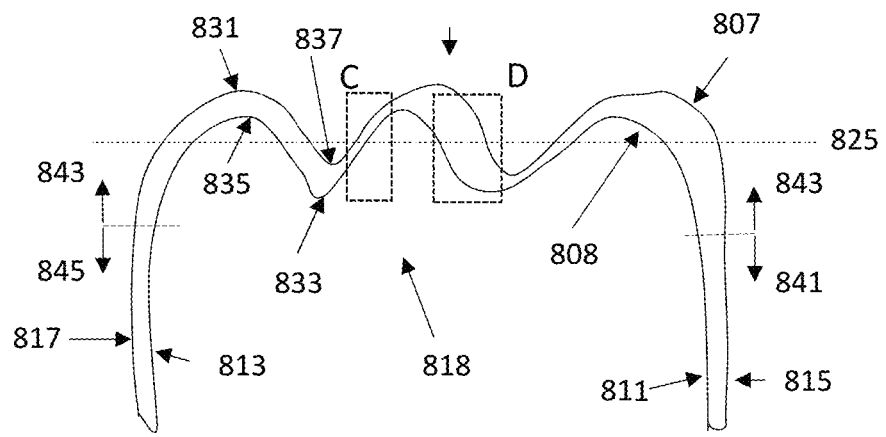
FIG. 8B shows a sectional view through an aligner device such as the one shown in FIG. 8B including an occlusal outer surface contour that is not aligned with the occlusal inner surface contour.

FIG. 8B shows a section through the aligner that include the the inner tooth-receiving region 818 and shows the occlusal inner surface contour 808 in the inner tooth-receiving region 818. The tooth-receiving region has an arrangement of chambers along its length that are configured to substantially conform to a first arrangement of cusps and nadirs corresponding to an occlusal surface of the patient's teeth. This inner region includes an occlusal inner surface 808 having a plurality of cusps and nadirs (e.g., high and low regions, which may be continuously connected on the surface). The aligner also includes a lingual inner surface 811 and lingual outer surface 815, as well as a buccal inner surface 813 and a buccal outer surface 817. The lingual outer and inner surfaces may be generally parallel (e.g., with small, e.g., <5%, <10%, <15%, <20%, <25%, <30%, etc.) deviation in thicknesses between them, as shown in FIG. 8B. Similarly, the buccal outer and inner surfaces may be generally parallel (e.g., with small, e.g., <5%, <10%, <15%, <20%, <25%, <30%, etc.) deviation in thicknesses between them. In contrast, the occlusal inner surface 808 may be opposite from the occlusal outer surface 807, and all or a portion of the occlusal inner surface may be offset (in the occlusal plane 825, perpendicular to the page and extending from the lingual to the buccal sides of the aligner device in FIG. 8B). Although the overall contours of the occlusal outer surface 807 and the occlusal inner surface 808 may have the same number and sequence order of cusps 831, 835 and nadirs 833, 837, the spacing between adjacent cusps and nadirs may be different. The sequence order may refer to the order of similarly shaped and/or sized cusps and nadirs in the occlusal surfaces (e.g., a first cusp having a first height, a first nadir having a first depth, a second cusp having a second height, a second nadir having a second depth, etc.). In FIG. 8B, the occlusal region 843'-843 is between the buccal 845 and lingual 841 regions.

As mentioned, the occlusal outer surface contour 807 is opposite the occlusal inner surface contour 808. The occlusal outer surface contour forms a second arrangement of cusps and nadirs that does not align with the first arrangement of cusps and nadirs when the occlusal inner surface is worn over the first arrangement of cusps. The intercuspation of the patient's teeth when wearing the dental aligner device therefore produces a bite force to move the one or more of the patient's teeth to the predetermined configuration.

Figure 8C:
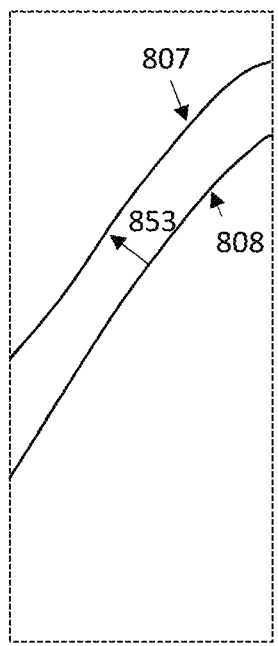
FIGS. 8C and 8D show enlarged views of different regions of the occlusal side of the 0aligner device of FIG. 8A showing different thickness regions between the occlusal inner surface contour and the occlusal outer surface contour.
Figure 8D:
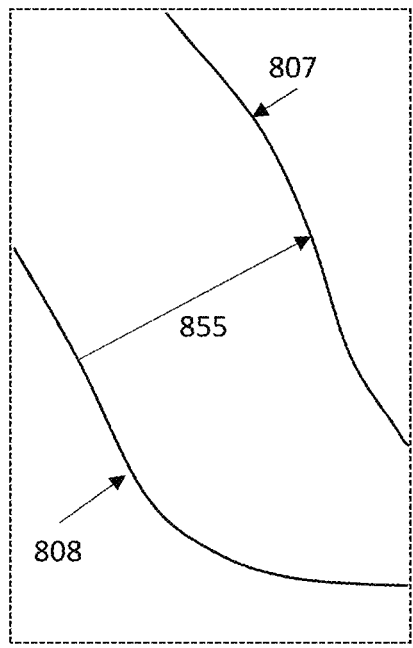

In FIG. 8B, the dental aligner device has a non-uniform occlusal thickness, e.g., the thickness between the occlusal inner surface 808 and the occlusal outer surface 807. As shown in the dashed regions (regions C and D) and FIGS. 8C and 8D, the thickness 853, 855 of these regions transverse to the inner or outer surfaces, typically varies by greater than 30% (e.g., greater than 35%, >40%, >45%, >50%, >55%, >60%, >70%, >80%, >90%, >100%, greater than 200%, etc.) along the occlusal surface. In FIG. 8C, the thickness 853 of the separation between the occlusal inner 808 and occlusal outer 807 surfaces is greater than 4× different (e.g., greater than 400%).

Thus, the methods and apparatuses described herein include dental apparatuses, and in particular orthodontic apparatuses, in which the appliance includes both a tooth-containing cavity that retains the patient's tooth/teeth and may apply force(s) to one or more of the retained teeth in order to change its position, e.g., to align the teeth. The apparatus may also include an occlusal surface on the opposite side from the cavity that is configured to selectively intercuspate to a target intercuspation with the patient's opposite jaw. This selective intercuspation may be with the patient's opposite jaw directly, in instances where the patient is not wearing an appliance on these opposite teeth, or it may be configured to intercuspate with an occlusive surface on an appliance that is worn on the opposite teeth.

In some variations the intercuspation provided by the outer contour of the aligner may be configured to mimic the final intercuspation of the treatment plan, so that the patient may experience the final intercuspation prior to the alignment of the teeth. These apparatuses and methods of using them may be helpful to provide the patient wearing these apparatuses with the feel of maxima intercuspation, even during an extended course of treatment in which the appliance is otherwise moving the patient's teeth. This may enhance comfort, and may also allow the patient to experience the feel proper intercuspation even as the patient's teeth would otherwise be unable to.

Figure 9:
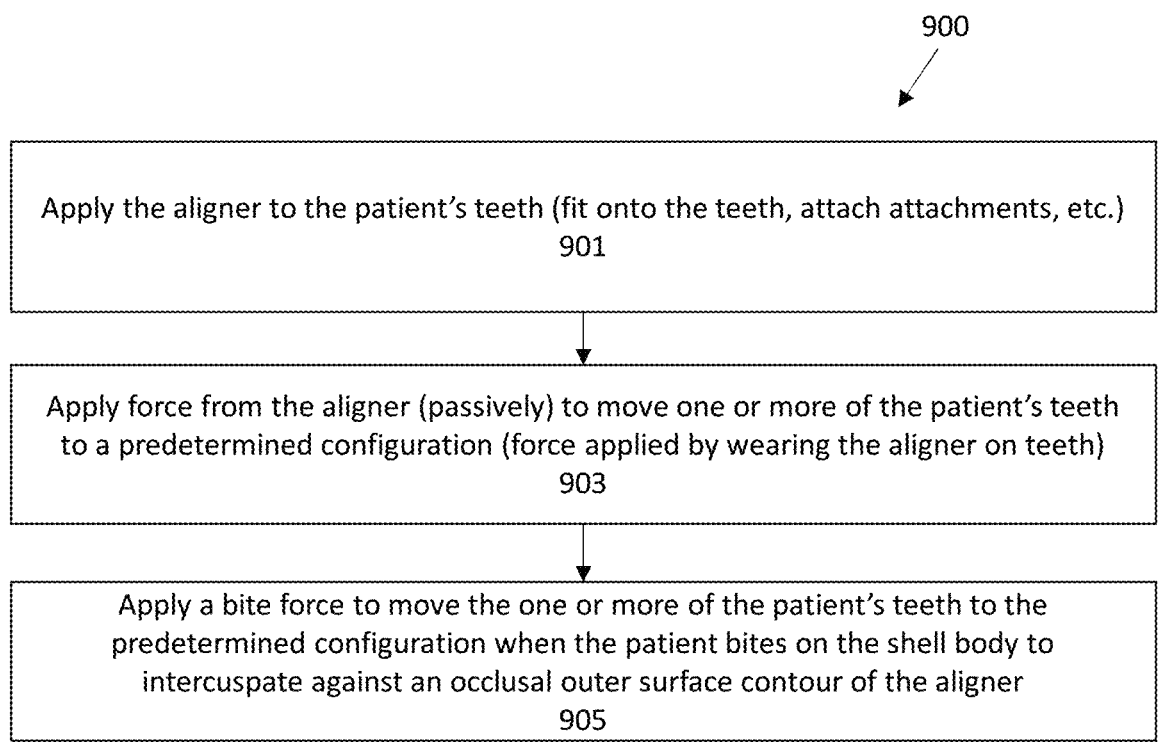
FIG. 9 illustrates one example of a method of orthodontically treating the patient's teeth (e.g., to align the teeth) including selective intercuspation.

As mentioned, the methods and apparatuses descried herein may also be configured to modify or improve alignment by means to of selective intercuspation. A method of treating a patient's teeth (e.g., to align the teeth) 900 is shown in FIG. 9. In this example, the method may include applying a dental aligner (such as an aligner having a shell body having a lingual side, an occlusal side, and a buccal side, wherein the shell body comprises an inner tooth-receiving region) onto the patient's teeth 901. Once applied onto the teeth (e.g., including attaching to any attachments on the teeth), the aligner may apply force to move the teeth. The force from the aligner may be applied to one or more teeth to move the teeth, and may arise from a combination of contacts between the aligner and the teeth as well as spacing (voids) in the aligner that provide room for the teeth to move into. Force may be applied by the aligner to a region of the tooth, and may be counterbalanced by a distributed force on other teeth. Thus, a first force may be applied by the aligner (passively) to move one or more of the patient's teeth to a predetermined configuration from the shell body being worn on the patient's teeth, e.g., when the patient's teeth are received in an inner tooth-receiving region of the shell body 903.

Further, the method may also include applying a bite force due to the selective intercuspation. For example, applying a bite force to move the one or more of the patient's teeth to the predetermined configuration when the patient bites on the shell body to intercuspate against an occlusal outer surface contour that is opposite the occlusal inner surface contour 905. The occlusal outer surface contour may form a second arrangement of cusps that does not align with the first arrangement of cusps when the occlusal inner surface is worn over the first arrangement of cusps.

Any of the methods, and particularly the methods of making the treatment plan and/or aligners (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A dental aligner comprising:
   a polymer body having a plurality of tooth receiving cavities shaped to receive and resiliently reposition a person's teeth from a first arrangement toward a target arrangement in accordance with a treatment plan, wherein a wall of a first tooth receiving cavity of the plurality of tooth receiving cavities is configured to resiliently apply a first force to a first tooth of the person's teeth in accordance with the treatment plan, the first tooth receiving cavity comprising:
   an occlusal inner surface forming a first configuration of cusps and nadirs shaped to conform to an occlusal surface of the first tooth,
   an occlusal outer surface that is opposite the occlusal inner surface, the occlusal outer surface forming a second configuration of cusps and nadirs, and
   one or more occlusal contact features protruding from the outer occlusal surface, wherein when the person wears the dental aligner and produces a bite force by biting on the dental aligner, the one or more occlusal contact features is configured to redirect the bite force on the first tooth toward a same or a complementary direction as the first force in accordance with the treatment plan.

2. The dental aligner of claim 1, wherein the one or more occlusal contact features extends less than 2 mm from the occlusal outer surface.

3. The dental aligner of claim 1, wherein the one or more occlusal contact features has a maximum diameter of 3 mm or less.

4. The dental aligner of claim 1, wherein the one or more occlusal contact features extends from a cusp on the occlusal outer surface.

5. The dental aligner of claim 1, wherein the bite force applies a moment to the first tooth to urge rotational movement of the first tooth.

6. The dental aligner of claim 1, wherein the bite force includes one or both of a horizontal force and a vertical force on the first tooth.

7. The dental aligner of claim 1, further comprising a bubble structure arranged to provide a space between the polymer body and a facet of the first tooth received therein, the bubble structure arranged to reduce the bite force applied to the facet.

8. The dental aligner of claim 7, wherein the bubble structure is configured to deflect toward the first tooth when the person bites on the dental aligner, thereby distributing the bite force along a surface of the facet.

9. The dental aligner of claim 1, wherein the one or more occlusal contact features is configured to contact an opposing tooth on an opposite jaw.

10. The dental aligner of claim 1, wherein the one or more occlusal contact features is configured to contact one or more second occlusal contact features of a second dental aligner on an opposite jaw.

11. A dental aligner system comprising:
a first aligner having a plurality of first tooth receiving cavities shaped to receive and resiliently reposition teeth of a first jaw toward a first target arrangement in accordance with a treatment plan, wherein a wall of a first tooth receiving cavity of the first aligner is configured to resiliently apply a first force to a first tooth of the first jaw in accordance with the treatment plan; and
a second aligner having a plurality of second tooth receiving cavities shaped to receive and resiliently reposition teeth of a second jaw toward a second target arrangement in accordance with the treatment plan, wherein a wall of a second tooth receiving cavity of the second aligner is configured to resiliently apply a second force to a second tooth of the second jaw in accordance with the treatment plan;
wherein at least one of the first and second aligners comprises a tooth receiving cavity comprising:
an occlusal inner surface and an opposing occlusal outer surface, each of the occlusal inner and outer surfaces including cusps and nadirs in accordance with an occlusal surface of the first or second tooth; and
one or more occlusal contact features protruding from the outer occlusal surface, wherein when a person wears the at least one of the first and second aligners and produces a bite force by biting on the at least one of the first and second aligners, the one or more occlusal contact features is configured to redirect the bite force on the first or second tooth toward a same or a complementary direction as the first or second force in accordance with the treatment plan.

12. The dental aligner system of claim 11, wherein the one or more occlusal contact features is a first one or more occlusal contact features of the first aligner, wherein the first aligner includes one or more first occlusal contact features, and the second aligner includes an opposing one or more second occlusal contact features, wherein the one or more first occlusal contact features is configured to contact the opposing one or more second occlusal contact features.

13. The dental aligner system of claim 11, wherein the first aligner includes the one or more occlusal contact features, and the second aligner does not include an opposing one or more occlusal contact features.

14. The dental aligner system of claim 11, wherein the one or more occlusal contact features extends from a cusp on the occlusal outer surface.

15. The dental aligner system of claim 11, wherein the bite force applies a moment to the first or second tooth to urge rotational movement of the first or second tooth.

16. The dental aligner system of claim 11, wherein the bite force includes one or both of a horizontal force and a vertical force on the first or second tooth.

17. The dental aligner system of claim 11, wherein the at least one of the first and second aligners further comprises a bubble structure arranged to provide a space between the at least one of the first and second aligners and a facet of the first or second tooth received therein, the bubble structure arranged to reduce the bite force applied to the facet.

18. A dental aligner comprising:
a polymer body having a plurality of tooth receiving cavities shaped to receive and resiliently reposition a person's teeth of a dental arch from a first arrangement toward a target arrangement in accordance with a treatment plan, wherein a wall of a first tooth receiving cavity of the plurality of tooth receiving cavities is configured to resiliently apply a first force to a first tooth of the person's teeth in accordance with the treatment plan, the first tooth receiving cavity comprising:
an occlusal inner surface forming a first configuration of cusps and nadirs shaped to conform to an occlusal surface of the first tooth,
an occlusal outer surface that is opposite the occlusal inner surface, the occlusal outer surface forming a second configuration of cusps and nadirs, and
a means for redirecting a bite force to move the first tooth toward the target arrangement when the dental aligner is worn on the dental arch and the person produces the bite force by biting on the dental aligner, wherein the means for redirecting the bite force is configured to redirect the bite force on the first tooth toward a same or a complementary direction as the first force in accordance with the treatment plan.

19. The dental aligner of claim 18, wherein the means for redirecting the bite force includes one or more occlusal contact features protruding from the outer occlusal surface.

20. The dental aligner of claim 18, wherein the means for redirecting the bite force includes one or more offset regions of the occlusal outer surface that is laterally offset in an occlusal plane relative to the occlusal inner surface.

* * * * *